(12) United States Patent
Crockett et al.

(10) Patent No.: US 7,340,043 B2
(45) Date of Patent: Mar. 4, 2008

(54) VOICE EXTENSIBLE MARKUP LANGUAGE-BASED ANNOUNCEMENTS FOR USE WITH INTELLIGENT NETWORK SERVICES

(75) Inventors: Susanne Marie Crockett, Buffalo Grove, IL (US); Nancy Ann Book, Palatine, IL (US)

(73) Assignee: AT&T Knowledge Ventures, L.P., Reno, NV (US)

( * ) Notice: Subject to any disclaimer, the term of this patent is extended or adjusted under 35 U.S.C. 154(b) by 0 days.

(21) Appl. No.: 10/807,159

(22) Filed: Mar. 24, 2004

(65) Prior Publication Data

US 2004/0247094 A1 Dec. 9, 2004

Related U.S. Application Data

(63) Continuation-in-part of application No. 10/345,291, filed on Jan. 16, 2003, and a continuation-in-part of application No. 10/345,233, filed on Jan. 16, 2003.

(51) Int. Cl.
*H04M 1/64* (2006.01)
(52) U.S. Cl. ............... 379/88.17; 379/221.08; 455/417; 704/275; 709/200
(58) Field of Classification Search ........... 379/223, 379/88.17, 221.08; 455/417; 704/275; 709/200; 370/328
See application file for complete search history.

(56) References Cited

U.S. PATENT DOCUMENTS

| 5,017,817 | A | 5/1991 | Yamakawa |
| 5,572,583 | A | 11/1996 | Wheeler, Jr. et al. |
| 5,913,160 | A | 6/1999 | Leung |
| 5,917,817 | A | 6/1999 | Dunn |
| 6,125,376 | A | 9/2000 | Klarlund et al. |
| 6,320,946 | B1 | 11/2001 | Enzmann et al. |
| 6,381,316 | B2 | 4/2002 | Joyce et al. |
| 6,381,324 | B1 | 4/2002 | Shaffer et al. |
| 6,404,876 | B1 | 6/2002 | Smith et al. |

(Continued)

FOREIGN PATENT DOCUMENTS

GB 2386289 9/2003

(Continued)

OTHER PUBLICATIONS

"Voice Extensible Markup Language (VoiceXML) Version 2.0", W3C Working Draft, Oct. 23, 2001, http://www.w3.org/TR/2001/WD-voicexml20-20011023/.

(Continued)

*Primary Examiner*—Gerald Gauthier
(74) *Attorney, Agent, or Firm*—Greenblum & Bernstein, P.L.C.

(57) ABSTRACT

An advanced intelligent network (AIN) telephony service provided in a public switched telephone network (PSTN) is controlled based on instructions from a subscriber, browsing a packet switched data network using a voice browser. A voice extensible markup language (VXML) platform is connected to a web server and a service control point (SCP). The web server stores announcements that can be easily created and modified by a subscriber. When the VXML platform receives an announcement ID from the SCP, the VXML platform determines a location where the announcement is stored based on the ID, and then plays the remotely stored announcement. Thus, the announcements can be easily changed without affecting the SCP and other AIN network elements.

23 Claims, 8 Drawing Sheets

U.S. PATENT DOCUMENTS

| | | | |
|---|---|---|---|
| 6,426,956 B1 | 7/2002 | Eteminan | |
| 6,438,601 B1 | 8/2002 | Hardy | |
| 6,456,616 B1 | 9/2002 | Rantanen | |
| 6,631,186 B1 | 10/2003 | Blumenschein et al. | |
| 6,813,342 B1 | 11/2004 | Chu | |
| 6,816,878 B1* | 11/2004 | Zimmers et al. | 709/200 |
| 6,879,676 B1 | 4/2005 | Contractor | |
| 6,882,838 B1* | 4/2005 | Lee et al. | 455/417 |
| 6,947,537 B2 | 9/2005 | Pershan | |
| 2002/0099776 A1 | 7/2002 | Caferella et al. | |
| 2002/0168055 A1 | 11/2002 | Crockett et al. | |
| 2002/0176557 A1 | 11/2002 | Burger | |
| 2003/0005076 A1 | 1/2003 | Koch et al. | |
| 2003/0007625 A1* | 1/2003 | Pines et al. | 379/223 |
| 2003/0018476 A1 | 1/2003 | Yuen et al. | |
| 2003/0043978 A1 | 3/2003 | Gallagher | |
| 2003/0076941 A1 | 4/2003 | Book et al. | |
| 2003/0083882 A1 | 5/2003 | Shemers, III et al. | |
| 2003/0095651 A1 | 5/2003 | Book et al. | |
| 2003/0099336 A1* | 5/2003 | Speeney et al. | 379/88.19 |
| 2003/0108179 A1 | 6/2003 | Chang et al. | |
| 2003/0202504 A1 | 10/2003 | Dhara et al. | |
| 2004/0111269 A1* | 6/2004 | Koch | 704/275 |
| 2004/0141596 A1 | 7/2004 | Crockett et al. | |
| 2004/0247094 A1 | 12/2004 | Crockett et al. | |
| 2006/0182055 A1* | 8/2006 | Coffee et al. | 370/328 |

FOREIGN PATENT DOCUMENTS

| | | |
|---|---|---|
| WO | 03/096664 | 11/2003 |

OTHER PUBLICATIONS http://www.intervoice-brite.com ( and http://www.intervoice-brite.com/ivbes/ invision).

http://www.nuance.com.

http://cafe.bevocal.com.

http://www.tellme.com.

"SpeechAccess Speaker Verification," http://www.intervoice-brite.com/ivbes/speechaccess/speaker_verification.html (downloaded Apr. 29, 2002) (the downloaded document apparently includes the same information presented in the above-noted http://www.intervoice-brite.com/ivbes/invision).

Intervoice Brite, "InVision User's Guide" (2d Edition 2001), Table of Contents and pp. 4-76 to 4-83.

"Nuance SpeechObjects," http://www.web.archive.org/web/20011204191501/www.naunce.com/products/speechobjects.html (downloaded Feb. 12, 2007), 4 pages, apparently indicating on the document a date of 2001.

Nuance Communications, Inc., "SpeechObjects Specification V1.0" (Nov. 14, 2000), http://www.w3org/TR/speechobjects (downloaded Feb. 9, 2007), 41 pages.

Bevocal Tutorial, http://web.archive.org/web/20020204132015/cafe.bevocal.com/ docs/tutorial/preface.html (downloaded Jan. 22, 2007), Preface, 2 pages.

Bevocal Tutorial, http;//web.archive.org/web/200204170510/cafe.bevocal.com/docs/ tutorial/intro.html (downloaded Jan. 22, 2007), Introduction, 4 pages.

"Voice Application Platform: Proven Design & Performance," and attached Datasheets on Voice Application Platform, CTI Connect and Tellme Notifier, http://web.archive.org/web/20011213235721/www.tellme.com/products/voiceapp.tsp (downloaded Jan. 22, 2007), apparently indicating on the document a date of 1999-2001.

"Application Development," http:/web.archive.org/web/20021207210457/usaninc.com/application.htm (downloaded Jan. 23, 2007), apparently indicating on the document a date of 2001.

* cited by examiner

VOICE EXTENSIBLE MARKUP LANGUAGE-BASED ANNOUNCEMENTS FOR USE WITH INTELLIGENT NETWORK SERVICES

CROSS-REFERENCE TO RELATED APPLICATIONS

The present application is a Continuation-In-Part of U.S. patent application Ser. No. 10/345,291, filed on Jan. 16, 2003, entitled "Voice Extensible Markup Language-based Web Interface with Intelligent Network Services", the content of which is expressly incorporated by reference herein in its entirety.

The present application is also a Continuation-In-Part of U.S. patent application Ser. No. 10/345,233, filed on Jan. 16, 2003, entitled "Voice Extensible Markup Language-based Web Interface with Intelligent Network Services", the content of which is expressly incorporated by reference herein in its entirety.

BACKGROUND OF THE INVENTION

1. Field of the Invention

The present invention relates to the field of telecommunications. More particularly, the present invention relates to advanced intelligent network (AIN) call services enhanced for voice interaction with subscribers and callers, based on voice browser software using extensible markup language (XML).

2. Acronyms

The written description contains acronyms that refer to various telecommunications services, components and techniques, as well as features relating to the present invention. Although some of these acronyms are known, use of these acronyms is not strictly standardized in the art. For purposes of the written description, the acronyms are defined as follows:

Advanced Intelligent Network (AIN)
Caller Identification (Caller ID)
Carrier Advanced Intelligent Network (CAIN)
Central Office (CO)
Common Object Request Broker Architecture (CORBA)
Dual Tone Multi-Frequency (DTMF)
Electronic Key Telephone System (EKTS)
Extensible Markup Language (XML)
Flexible Call Forwarding (FCF)
Generic Data Interface (GDI)
Graphical User Interface (GUI)
HyperText Mark-Up Language (HTML)
HyperText Transfer Language Protocol (HTTP)
Incoming Call Manager (ICM)
Integrated Services Digital Network User Part (ISUP)
Intelligent Network Application Part (INAP)
Interactive Voice Response (IVR)
Internet Caller Identification (ICID)
Internet Information Server (IIS)
Line Information Databases (LIDB)
Numbering Plan Area (NPA)
Off Hook Delay (OHD)

Origin-Dependent Routing (ODR)
Outgoing Call Control (OCC)
Percent Allocation Routing (PAR)
Personal Computer (PC)
Personal Call Manager/Personal Communications Manager (PCM)
Personal Digital Assistant (PDA)
Personal Identification Number (PIN)
Plain Old Telephone Service (POTS)
Practical Extraction Report Language (PERL)
Public Switched Telephone Network (PSTN)
Release Link Trunk (RLT)
Service Control Point (SCP)
Service Management System (SMS)
Service Switching Point (SSP)
Signaling System 7 (SS7)
Signaling Transfer Point (STP)
Session Initiation Protocol (SIP)
Time-Dependant Routing (TDR)
Time of Day/Day of Week (TOD/DOW)
Terminating Attempt Trigger (TAT)
Transaction Capabilities Application Part (TCAP)
Transmission Control Protocol/Internet Protocol (TCP/IP)
Uniform Resource Locator (URL)
Uniform Resource Identifier (URI)
Voice Extensible Markup Language (VXML)
World Wide Web (WWW)
World Wide Web Consortium (W3C)

3. Background Information

Advanced Intelligent Network (AIN) services are telecommunication services provided to subscribers and implemented by a processor in the public switched telephone network (PSTN). Generally, a central processing unit, such as a service control point (SCP), is accessed during call processing through a signaling network, while a corresponding telephone call is suspended at an originating or a terminating central office (CO) switch. The SCP determines whether to invoke telecommunications services based on, for example, the calling party directory number or the called party directory number of the triggering telephone call. When an AIN service is invoked, the SCP determines the routing of the call accordingly. Based on the call routing determination, the SCP instructs the CO switches through the signaling network on the appropriate call handling. For example, based on a subscriber's active AIN service, the SCP may instruct the CO to route the call to a forward-to directory number or to a voice mail system.

Certain AIN services are designed to include collecting information from the calling party during the call in order to determine the appropriate call routing. For example, services may require the entry of an identification number or password in order to enable completion a call. Similarly, AIN services may include presenting a series of options to the calling party, the response to which dictates the ultimate termination of the call. Generally, the SCP identifies the information that must be collected from the calling party, based on the AIN services invoked during call processing, in order to properly route the call.

One conventional method of collecting information for call routing includes activating an automated interactive voice response (IVR) system, either in the CO or an intelligent peripheral (IP), connected to the SCP through the PSTN signaling network. The IVR is preprogrammed to play scripts (e.g., menus of verbally recited selection choices) to the calling party. The scripts are retrieved from a preestablished conventional database associated with the IVR and verbally request the data needed to complete call routing in accordance with the AIN service. Conventionally, the calling party enters responses to the requests using the key pad of a standard dual tone multi-frequency (DTMF) telephone device. Such interaction is limited, however, due to the tedious nature of the calling party interaction, as well as the somewhat cumbersome programming requirements and limited capacity of IVR systems. Although automated speech recognition capability in IVRs offers some improvement, such systems are generally not available in AIN systems. Also, the same script and database limitations of a DTMF compatible IVR apply equally to an IVR offering speech recognition.

In addition, some AIN services simply provide substantive information to the calling party, through the preprogrammed scripts of the IVR, without further routing the call. For example, the IVR may simply state that the caller is not available and to try the call again at a later time. Again, the response of the IVR is limited to the group of preprogrammed responses established on behalf of the subscriber. Once implemented, the options of the IVR are essentially set until further action is taken to update the service data.

For many call control services, the service subscribers submit requests to the customer service arm of their provider to initiate new services or update existing ones. The requests are implemented according to the provider's time line and discretion. It is difficult for the users to gauge when the service alteration will take effect. When the service requires integration of an IVR to execute the service, the service provider must access and program the IVR according to the subscriber's specific service requests. The IVR may be programmed to access a database of subscriber data, but the information in the database is generally limited to certain predetermined parameters and the structure is inflexible.

Systems have been proposed to enable subscribers to directly access AIN call service data at the SCP through a centralized database or server, such as a service management system (SMS). The data is accessible by the SCP through a PSTN data network, as well as by a web client over a packet switched data network, such as the Internet, and by a DTMF telephone through an IVR. However, the IVR connection, in particular, is quite limited. For example, a programmer of the service provider is generally required in order to manipulate the programming of the IVR (or the IP that implements the IVR), including changing the service logic, altering or adding menus, adding additional service capabilities, and the like.

The present invention overcomes the problems associated with the prior art, as described below.

BRIEF DESCRIPTION OF THE DRAWINGS

The present invention is further described in the detailed description that follows, by reference to the noted drawings by way of non-limiting examples of embodiments of the present invention, in which like reference numerals represent similar parts throughout several views of the drawings, and in which.

DETAILED DESCRIPTION OF EMBODIMENTS

The present invention relates to enhancing AIN call services using a voice XML (VXML) server to enable efficient communication between a calling party and the PSTN. Furthermore, the incorporation of the VXML server enables greater flexibility to seek and retrieve call related data from the Internet, while maintaining control of the call within the PSTN.

The AIN call services to which the VXML voice enhancement applies may be implemented individually or through a Personal Call Manager (PCM) system, along with other telecommunication services, such as call monitoring, Flexible Call Forwarding (FCF), Internet Caller Identification (ICID), Incoming Call Manager (ICM), Outgoing Call Control (OCC) and personal directories.

The present invention also relates to an AIN-based service that allows a subscriber connected to a communications network, including the Internet and other packet switched type data networks, to customize and implement the AIN call services, with near real-time access to the service data. Furthermore, the present invention enables the VXML server to incorporate voice recognition, further simplifying the subscriber and/or caller interaction with the AIN call services when not using the communications network.

In view of the above, the present invention through one or more of its various aspects and/or embodiments is presented to accomplish one or more objectives and advantages, such as those described in detail below.

Figure 1:
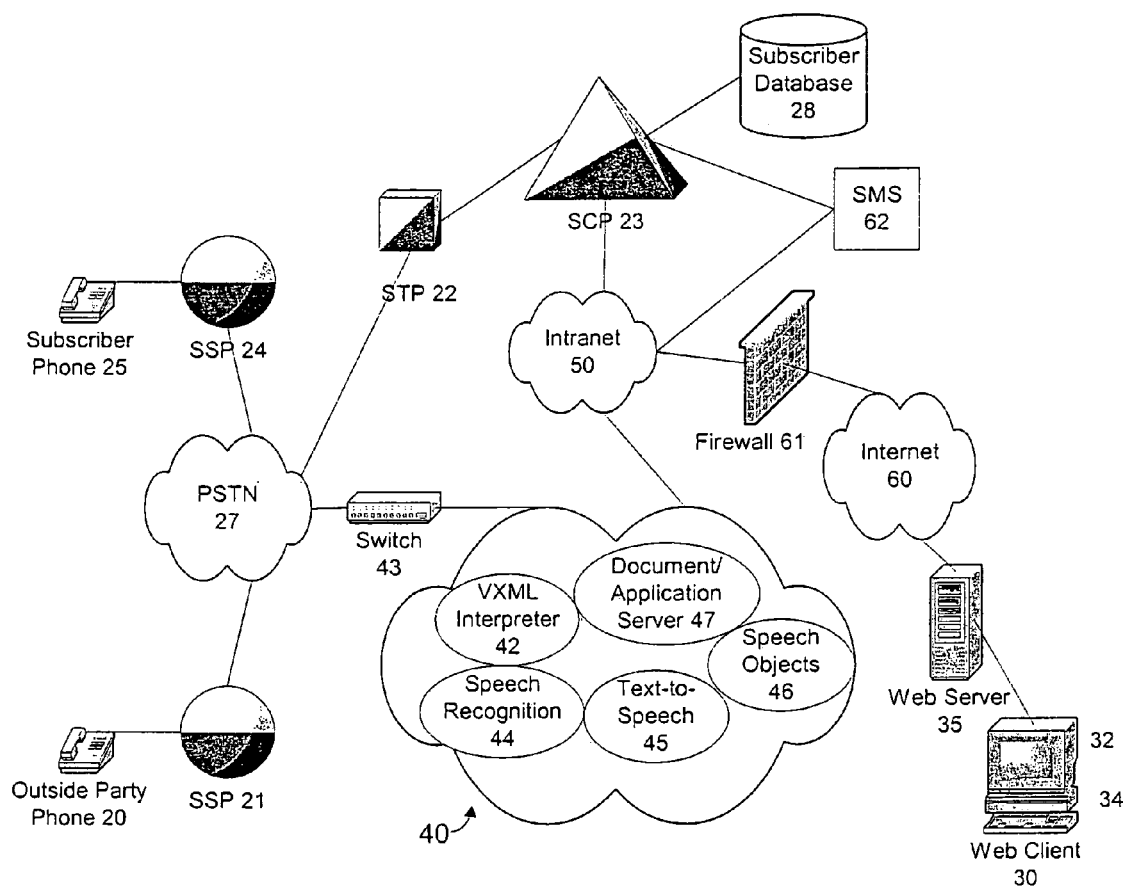
FIG. 1 is a block diagram showing an exemplary telecommunications network, according to an aspect of the present invention.

FIG. 1 illustrates an exemplary telecommunications network in association with a VXML server of the present invention. The network includes an outside party telephone 20, service switching points (SSPs) 21 and 24, and a subscriber telephone 25. The outside party telephone 20 and the subscriber telephone 25 may be any type of PSTN compatible telephone, including a plain old telephone service (POTS) telephone, or a telephone in a Centrex system, a PBX system or an electronic key telephone system (EKTS). Because of the voice recognition attributes of the present invention, the outside party telephone 20 and the subscriber telephone 25 do not need to be dual tone multiple frequency (DTMF) capable. The SSPs 21 and 24 are connected to one another through the PSTN 27, which may include any number of interim switches, including for example tandem switches and interexchange switches.

Depending on the call origination point, the SSP 21 and the SSP 24 may be either the originating or the terminating switch. For example, if a call is placed from the outside party telephone 20 to the subscriber telephone 25, the SSP 21 is the originating switch and the SSP 24 is the terminating switch. If a call is placed from the subscriber telephone 25 to the outside party telephone 20, the SSP 24 is the originating switch and the SSP 21 is the terminating switch. However, as a practical matter, the originating switch and the terminating switch may be the same, or the call may be routed through any number of intervening switches in the PSTN 27 between the originating and the terminating switches. The SSPs 21 and 24 include, for example, 1AESS or 5ESS switches manufactured by Lucent Technologies, Inc.; DMS-100 or DMS-250 switches manufactured by Nortel Networks Corporation (Nortel); AXE-10 switches manufactured by Telefonaktiebolaget LM Ericsson, or EWSD switches available from Siemens Information and Communication Networks, Inc. The switches may utilize an AIN Release 0.2 protocol or a Carrier AIN (CAIN) protocol. However, embodiments of the present invention may include switches, such as ATM and soft switches, that are incorporated into any alternative telecommunications technology.

The exemplary network also includes a signaling transfer point (STP) 22 and a service control point (SCP) 23, capable of communicating with one another, and with the SSPs 21 and 24, through the PSTN 27 using out of band signaling, such as SS7 signaling. By way of example, the SCP 23 is implemented with the Telcordia Integrated Service Control Point, loaded with ISCP software Version 4.4 (or higher), available from Telcordia, Murray Hill, N.J. In an alternative embodiment of the invention, the SCP 23 may be a Lucent Advantage SCP, with software release 94, available from Lucent Technologies, Inc.

The SCP 23 includes a subscriber database 28 containing information relating the various AIN services to the corresponding subscribers. In an embodiment of the invention, the subscriber database 28 is external to the SCP 23, as indicated in FIG. 1. The interface with the external database would include a compatible protocol, such as SR-3389, also known as a generic data interface (GDI), or SR-3511, common object request broker architecture (CORBA). However, the subscriber database 28 may be entirely or partially contained within the SCP 23. For example, the SCP 23 may include an internal AIN service database, and rely on external databases for associating authentication data or directory number/name data, which may be implemented as line information databases (LIDBs). The exemplary network depicted in FIG. 1 also includes a service management system (SMS), connected to the SCP 23 through a data network. The SMS 62 may be used to build and implement AIN services in the SCP 23 and further act as an interface between the SCP 23 and the Internet 60.

The call flow logic of the present invention may be upgraded to accommodate future AIN releases and protocols and future trigger types. Specifications of AIN Release 0.2 SSPs may be found in Telcordia TR-NWT-001299, Switch-Service Control Point Application Protocol Interface Generic Requirements, and Telcordia Technical Reference TR-NWT-001298, AIN Switching Systems Generic Requirements, the disclosures of which are expressly incorporated by reference herein in their entireties.

The network further includes a VXML platform 40, which effectively enables dynamic voice communications between the SCP 23, implementing the AIN services, and either the subscriber telephone 25 or the outside party telephone 20. The VXML platform 40 is accessible from the PSTN 27 through the switch 43. The VXML platform 40 includes, for example, a VXML interpreter 42, a VXML document/application server 47, a speech recognition engine 44, a text-to-speech engine 45 and a speech objects engine 46. In alternative embodiments of the invention, any number of the various elements included in the VXML platform 40 may be incorporated into a single server, including the switch 43, or may exist separately. Although the various elements of the VXML platform 40 are identified and discussed separately, the format is intended merely to enhance the clarity of the disclosure and not to be limiting in any way.

The VXML platform 40 may be any server capable of handling voice communications in XML, such as a WEB-SPHERE VOICE SERVER,™ available from IBM, a Nuance Voice Platform, available from Nuance Communications, Inc., or an Alcatel 8686 Special Resource Point (SRP), both available from Compagnie Financière Alcatel. In an embodiment of the invention, the VXML platform 40 is programmed with Voice Extensible Markup Language (VoiceXML) Versions 1.0 or 2.0, available from World Wide Web Consortium (W3C), the contents of which are expressly incorporated by reference herein in its entirety. Alcatel Genesys Voice Portal software, available from Genesys Telecommunications Laboratories, Inc. may be used.

Similar to conventional HTML, VoiceXML is based on a series of tags embedded within the text of the script. However, rather than being executed on a web browser, VoiceXML scripts are executed on an interpreter (e.g., the VXML interpreter 42), accessible by a calling party. The invention is not limited to use of VoiceXML, but may include any voice browser software using an XML-based markup language, such as Speech Application Language Tags (SALT), also available from W3C.

The VXML platform 40 may be further programmed with speaker independent Nuance 8.0 speech recognition software or other compatible speech recognition software, to enable the speech recognition functionality. The speech recognition functionality may include multiple languages, including English, Spanish and French.

In an embodiment of the invention, the VXML platform 40 is capable of generating VoiceXML scripts or dialogs, e.g., menus and forms, which are received by the calling party at the outside party telephone 20 or the subscriber telephone 25. A menu verbally provides multiple selections from which the calling party chooses an option. The calling party may speak the selection (typically a number associated with the option) or depress the appropriate DTMF key on the telephone keypad. A form is open ended in that it verbally provides scripted data to the calling party, but does not necessarily list choices or otherwise invite a dialog with the calling party. A script, or portion of a script, may also be informational only, in that it provides information without necessarily listing specific caller choices.

The VXML platform 40 communicates with the AIN network (specifically the SCP 23) through an intranet 50 using, for example, TCP/IP, TCAP over TCP/IP, SIP, HTTP, or any other compatible interface. The VXML platform 40 is able to request and retrieve data relating to the AIN service, as well as instructions relating to information needed from the calling party, over the intranet 50. The SCP 23 is likewise able to retrieve data from the VXML platform 40 through the intranet 50. The VXML platform 40 may alternatively interface with the external subscriber database 28 through the intranet 50 without involving the SCP 23, which reduces the processing demands on the SCP 23. In an embodiment of the invention, the VXML platform 40 also determines call routing.

The VXML platform 40 may communicate with the SCP 23 using intelligent network application part (INAP) signaling. If the VXML platform 40 is an Alcatel SRP, the SCP 23 communicates with an IP portion of the SRP. That is, the Alcatel SRP is divided into two components: an IP component and a voice interactive media server (VIMS) component.

In an embodiment of the invention, there is no need for the SCP 23 to support HTTP. Rather, a web host (not pictured), associated with the SCP 23, is connected to the VXML platform 40 through the intranet 50 and responds to data sent by the VXML platform 40. An application server of the web host, or an application, if written in Java, practical extraction report language (PERL) or the like, interacts with an AIN database, such as the subscriber database 28. For example, the VXML platform 40 may request a calling party to enter a personal identification number (PIN) related to an AIN service. The spoken PIN is translated into text by the speech recognition engine 44 and sent to the web host through the intranet 50, which is comparable to the calling party entering data on a web page and pressing submit. The web host application server responds by connecting to the subscriber database 28, retrieving the PIN data and comparing the PIN data with the data entered by the calling party. The connection between the web host and the subscriber database 28 is a standard database connection (like the connection between the SCP 23 and the subscriber database 28, discussed above). The web host application server may then format text in XML to notify the calling party of the results of the PIN comparison. The text is sent back to the VXML platform 40 over the intranet 50, converted to audio by the text-to-speech engine 45 and provided to the calling party through the PSTN 27.

The VXML platform 40 communicates with the calling party through the PSTN 27 through a VXML switch 43 and a CO, such as the SSP 24. The switch 43 may be, for example, a VCO/4K open programmable switch available from Cisco Systems, Inc. The VXML platform 40 is thereby able to receive and transmit voice communications with the calling party at the outside party telephone 20 or the subscriber telephone 25.

In alternative embodiments of the invention, the outside party telephone 20 and the subscriber telephone 25 communicate with the VXML platform 40 either over a temporary communication connection or by direct routing. The temporary connection is enabled, for example, by suspending the call at a PSTN switch (e.g., the SSP 24) and establishing a GR-1129 protocol connection between the SSP 24 and the VXML platform 40 through the switch 43. By suspending the call and enabling the GR-1129 connection, the call is efficiently forwarded, based on instructions ultimately provided by the SCP 23, after the calling party interfaces with the VXML platform 40 to provide information potentially needed for the SCP 23 to determine the appropriate routing. Another example of a temporary connection includes routing the call to the VXML platform 40 using SS7 integrated services digital network user part (ISUP) signaling or intelligent network application part (INAP) signaling. As in the GR-1129 example, the SCP 23 remains in control of the call throughout the interface between the calling party and the VXML platform 40, enabling the SCP 23 to subsequently provide instructions to the SSP 24 on appropriate call routing.

In the embodiment in which the call is routed to the VXML platform 40, the call is connected through the switch 43, for example, using well-known signaling techniques through the PSTN 27, such as SS7 signaling, or using a release link trunk (RLT). In this embodiment, the SCP 23 does not retain control of the call, so additional steps are taken to implement additional call routing, determined by the SCP 23, discussed below.

As discussed above, FIG. 1 separately depicts the functionality of the VXML platform 40. The communications between the calling party and the VXML platform 40 are enabled and controlled by the VXML interpreter 42. The VXML interpreter 42 executes the logic to play audio scripts (e.g., menus and forms) to the calling party, receive corresponding verbal or DTMF responses, and determine the additional interface steps, if any, needed to complete the interaction. The VXML interpreter 42 also establishes a connection to a server, such as the VXML document/application server 47 or a web server in the Internet 60 (e.g., the web server 35) to retrieve applications (VXML documents or sets of documents) to be verbally recited to the calling party. Although depicted as included in the VXML platform 40, the document/application server 47 may be a separate server, such as an Internet Information Server (IIS), developed by Microsoft Corporation, running Microsoft IIS 4.0 software, for example. In an embodiment of the invention involving VoiceXML, the VXML interpreter 42 functions through an interface, referred to as an VoiceXML interpreter context, which is responsible for detecting and answering incoming calls, as well as acquiring initial documents from the server.

If an Alcatel SRP is being employed, the SCP 23 sends a message (e.g., a Send To Resource message), including an announcement ID, to the IP component in the VXML platform 40. The IP component examines the message and after recognizing that the message should be forwarded to the VIMS (based upon how the announcement ID is encoded), forwards the announcement ID to the VIMS component. Upon identifying the announcement ID as corresponding to a location, e.g., a URL, the VIMS component translates the announcement ID into the corresponding location and then retrieves the announcement from a remote server based upon the location.

The translation may be based upon a location address provided when a customer initially sets up a customer profile. For example, the customer may inform the carrier of the location of the customer's server that stores messages. If the carrier is providing the server, the carrier will provide the location of the server within the customer profile. In both cases, an administrator can assign the filenames within the location.

Generally, the VXML platform 40 provides audio generated by the text-to-speech engine 45 or the speech objects engine 46. For example, XML or HTML strings of text may be retrieved by the text-to-speech engine 45 from the VXML document/application server 47 using HTTP, based on a uniform resource identifier (URI) of the associated document. The text-to-speech engine 45 converts the strings of text into synthesized speech using, for example, Microsoft RealSpeak software. Alternatively, the speech objects engine 46 may retrieve prerecorded audio voice strings stored at the VXML document/application server 47 in an audio file format, such as .WAV, MPEG Layer 3 (MP3), or the like. In both scenarios, the audio is passed to the VXML interpreter 42, which streams the audio to the calling party through the switch 43 and the PSTN 27, through the GR-1129 or the switched connection, as discussed above.

The speech-related text and the prerecorded voice data may be created and maintained by the service provider at the document/application server 47. In an embodiment of the invention, the subscriber is able to build the text and prerecorded voice data at the exemplary web server 35, using an device capable of communication with the Internet 60, including the web client 30 or the subscriber telephone 25 (through the VXML platform 40), as discussed below.

The VXML platform 40 may then retrieve the text and voice data from the web server 35, as needed for call processing by the SCP 23.

The VXML platform 40 may further provide voice authentication for implementing AIN services that involve restricted access. A voice identifier (not pictured), programmed with Nuance Verifier 3.0 software, for example, may be incorporated in the VXML platform 40 to enable efficient subscriber authentication based on the calling party's voice print. In an exemplary incoming call monitoring scenario, rather than requesting an override PIN, the VXML platform 40 may simply compare the calling party's voice print with a prerecorded sample in order to determine whether the call may be completed to the subscriber telephone 25.

The calling party's spoken responses are received at the speech recognition engine 44 by way of the VXML interpreter 42. The speech recognition engine 44 is preferably speaker independent, in that it does not need to be "trained" based on each individual user's voice. The calling party's spoken responses are converted into digital data by the speech recognition engine 44. The spoken responses may also be stored, for example, in the document/application server 47 in .WAV or MP3 format.

Generally, the received data is segmented, or arranged into recognizable patterns, and compared to previously stored models of words to be recognized. The segmentation of data may be based on any number of conventional speech recognition techniques. For example, the data may be segmented into phonemes, which are basic sounds or units of speech, and compared to phonetic models to build and identify words. The phoneme based speech recognition may enable identification of continuous or fluent speech from the subscriber. Alternatively, the speech data may be segmented by timing to search for and match previously identified anticipated responses, such as simple words and phrases, including numbers, letters of the alphabet and predetermined command words, such as ON, OFF and the days of the week. The present invention may incorporate any level of speech recognition and associated vocabulary capable of handling voice interactions between the subscriber and the AIN services.

Furthermore, the VXML platform 40 is able to confirm the calling party's responses, through the speech recognition engine 44 and the text-to-speech engine 45, to assure that the responses were received and interpreted accurately. The calling party's verbal input is processed into digital data by the speech recognition engine 44 and subsequently converted into synthesized speech by the text-to-speech engine to be transmitted back to the calling party for confirmation. For example, after requesting and receiving the numbers of the subscriber's PIN, the VXML platform 40 generates a prompt asking, "You said that your PIN was '1234.' Please say 'yes' if this is correct and 'no' if this is not correct." Confirmation is particularly useful when a spoken response received at the VXML platform 40 results in a low level of confidence in the speech recognition.

A data network, capable of interfacing with the VXML system 40 includes a web client 30 and a web server 35 connectable to the VXML system 40, through the Internet 60 and a firewall 61. As stated above, the data network is likewise capable of interfacing with the AIN at the SCP 23 through the Internet 60 and a known interface, such as the SMS 62 or an intelligent peripheral (not pictured). FIG. 1 depicts a direct connection between the web server 35 and the web client 30, such as a conventional T1 or cable modem connection, although the connection is intended to include any type of Internet interface, including a telephone modem connection from the subscriber telephone 25 and the associated SSP 24. Furthermore, although the functionality of the Internet 60 is described as involving the web server 35, it is understood that the Internet 60 includes numerous other web servers, which may implement all or a portion of the disclosed functionality.

The web client 30 includes a GUI 32, e.g., a personal computer (PC), operating client software 34. Alternatively, the client software 34 can be run at the web server 35. The web client 30 incorporates a web browser, such as Microsoft Internet Explorer, available from Microsoft Corporation, or Netscape Navigator, available from Netscape Communications Corporation. In an exemplary embodiment of the invention, the web client 30 is implemented with an IBM Pentium based PC, running the Linux operating system, available from the Free Software Foundation, Inc., or the Microsoft Windows operating system, and running the Microsoft Internet Explorer, Netscape Navigator or HotJava, available from Sun Microsystems, Inc., web browser software. The web client 30 may be any other device capable of communicating over the Internet, such as a personal digital assistant (PDA), an Internet compatible wireless telephone, or the like. Also, the web server 35 may run the Linux or Microsoft Windows operating system and Apache web server software, available from the Apache Software Foundation, or the Jigsaw web server software, available from W3C.

Figure 2A:
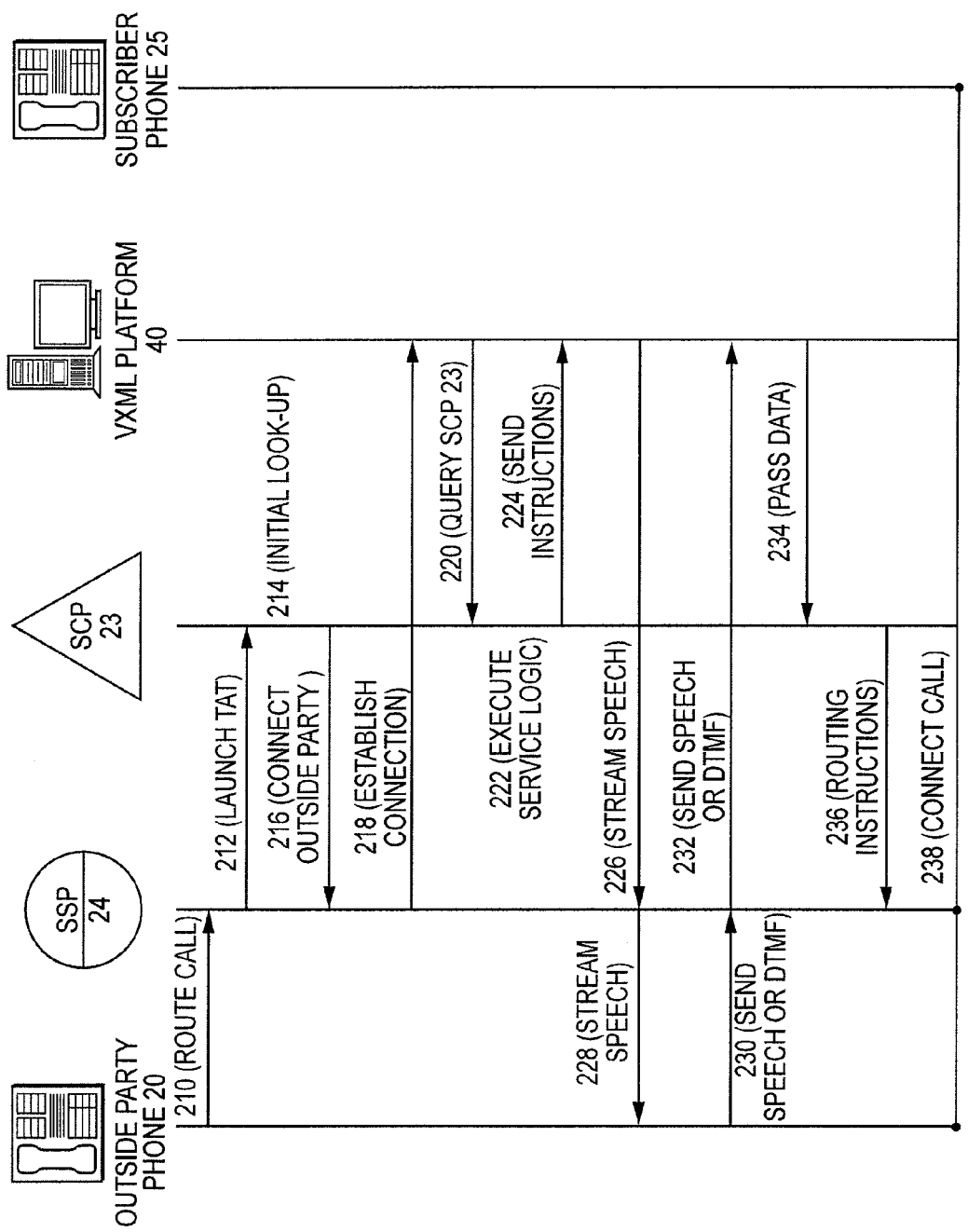
FIG. 2A is an exemplary call flow diagram showing routing of a telephone call to a subscriber telephone in accordance with an AIN service, using a VXML platform, according to an aspect of the present invention.

As stated above, an aspect of the present invention includes routing a call to or from the subscriber telephone 25, based on AIN service related routing instructions derived, in part, from information obtained from the caller by the VXML platform 40. FIG. 2A is a call flow diagram depicting an exemplary implementation of the VXML functionality in conjunction with an AIN service based on a call originating at the outside party telephone 20 and directed to the subscriber telephone 25. FIG. 2A, in particular, depicts an embodiment in which the VXML platform 40 is connected to the outside party telephone 20 through a GR-1129 protocol connection, while the call is suspended at the terminating switch, the SSP 24.

The steps of FIG. 2A are applicable to any AIN service that is triggered by the subscriber's terminating switch, such as AIN call forwarding, incoming call control, call blocking, routing terminating calls to voice mail, caller identification and Internet caller identification. Examples of compatible AIN services are included in the following, co-pending United States patent applications, the disclosures of which are expressly incorporated by reference herein in their entireties: U.S. patent application Ser. No. 09/619,312, filed on Jul. 19, 2000, entitled "System and Method for Providing Integrated Access by Subscribers to Customized Telecommunication Services Management System" in the names of Anil K. Bhandari et al.; U.S. patent application Ser. No. 09/716,276, filed Nov. 21, 2000, entitled "System and Method for Implementing and Accessing Call Forwarding Services" in the names of Gordon L. Blumenschein et al.; U.S. patent application Ser. No. 09/983,303, filed Oct. 24, 2001, entitled "System and Method for Restricting and Monitoring Telephone Calls" in the names of Nancy A. Book et al.; U.S. patent application Ser. No. 09/987,870, filed November 16, entitled "System and Method for Routing Terminating Calls to Voice Mail" in the names of Nancy A. Book et al.; and U.S. patent application Ser. No. 09/545,459, filed Apr. 7, 2000, entitled "Internet Caller Identification System and Method" in the names of Thomas Adams et al.

To invoke the VXML platform 40, the calling party initiates a call from the outside party telephone 20 to the subscriber telephone 25 by dialing the subscriber's directory number. The call is routed to the terminating SSP 24 at step 210. The call may be initially routed through an originating SSP 21 (not shown), which ultimately forwards the call to the SSP 24, either based on instruction from the SCP 23 or through normal translations. The call may be forwarded to the SSP 24 directly or through a number of intervening switches in the PSTN 27. The SSP 24 launches a terminating attempt trigger (TAT), which includes at least the calling party number and the called party number, via the SS7 network and the appropriate STP 22 (not pictured in FIG. 2A) to the subscriber's serving SCP 23 at step 212. Although the call flow depicted in FIG. 2 includes an exemplary TAT to initiate communications with the SCP 23, it is understood that any other initiating AIN trigger may be used, including originating switch triggers (discussed below) and mid-call triggers.

At step 214, the SCP 23 performs an initial look-up at the subscriber database 28 to determine whether the subscriber is entitled to VXML AIN services, based on the called party number, for example. The VXML capability may be separately available to the subscriber or it may be packaged with another AIN service to which the subscriber subscribes. When the SCP 23 determines that the VXML service is available for the call, the SCP 23 instructs the SSP 24 at step 216 to connect the outside party telephone 20 with the VXML platform 40. The SSP 24 establishes the connection in accordance with GR-1129 protocol at step 218. In other words, the SSP 24 suspends the call, while setting up a temporary audio channel with the VXML platform 40.

Once the connection is established, the VXML platform 40 detects the incoming call and initiates an application, which directs the VXML platform 40 to query the SCP 23, through the intranet 50, at step 220. The query includes identification of the call, such as the calling party number and the called party number. At step 222, the SCP 23 executes the service logic associated with the subscriber's AIN service in response to the query. The specific service or services to be invoked may be identified based on the called party number, or other unique subscriber related identification information passed to the SCP 23 from the VXML platform 40.

In an alternative embodiment, step 222 may be executed in conjunction with step 214. In other words, the SCP 23 determines the availability of the VXML server, executes the appropriate AIN service logic and sends the relevant data to the VXML platform 40, based on the initial query received from the SSP 24 at step 212. For example, the SCP 23 may send specific instructions, which enable the VXML platform 40 to identify the call, as well as to identify the documents to be retrieved and the scripts to be played to the calling party. An advantage of the alternative embodiment is that the VXML platform 40 will not need to initially query the SCP 23 upon establishment of the GR-1129 connection with the SSP 24. It will already have the data and will be anticipating the imminent connection at step 218. The processing performed by the SCP 23 at step 222 may include, for example, determining whether an AIN service is ON or OFF and determining whether any ancillary functions are activated, such as screening lists or weekly schedules.

Assuming that the AIN service is active, the SCP 23 sends instructions and/or the relevant data to the VXML platform 40 through the intranet 50 at step 224. The data enables the VXML interpreter 42 of the VXML platform 40 to identify an applicable application (e.g., a VXML document or set of documents) to be retrieved from the document/application server 47. The documents include a script (e.g., menus or forms) to be provided to the caller. For example, the data received from the SCP 23 may identify the called party number as being associated with an incoming call monitoring service, an example of which is described in U.S. patent application Ser. No. 09/983,303, filed Oct. 24, 2001, entitled "System and Method for Restricting and Monitoring Telephone Calls" in the names of Nancy A. Book et al. The data may further indicate that the calling party number is not on a priority screening list, so that the call will not be connected to the subscriber telephone 25 unless the calling party enters an acceptable override PIN. The VXML platform 40 is therefore instructed by the SCP 23 (or determines through its own processing logic) to play a script to the calling party requesting entry of a PIN. As discussed above, the script may be synthesized speech converted from strings of text by the text-to-speech engine 45 or pre-recorded speech provided by the speech objects engine 46. The VXML interpreter 42 accordingly acquires the application containing the script in voice markup language format from the document/application server 47.

The speech invoked by the script is streamed through the VXML interpreter 42 to the outside party telephone 20, by way of the GR-1129 connection with the SSP 24, at steps 226 and 228. The calling party responds verbally to the audio information, selecting one of multiple options or providing requested information. The calling party may likewise respond using DTMF keys of the outside party telephone 20. As applied in the incoming call monitor example, the caller may be provided a choice of entering "one" to input an override PIN, "two" to terminate the call or "three" to leave a message in voice mail. Of course, other AIN services would include corresponding menus. For example, the caller may be provided a choice of entering "one" to proceed in English and "two" to proceed in Spanish.

When the calling party responds, the VXML interpreter 42 receives the spoken or DTMF information through the GR-1129 connection with the SSP 24 at steps 230 and 232. The response is received in a predesignated response field of the VXML script. When the response is spoken, the speech recognition engine 44 converts the speech to text (e.g., digital data) to enable further processing. In an embodiment of the invention, the spoken response may also be recorded as an audio file and stored, for example, at the document/application server 47. The VXML platform 40 passes data indicating the calling party's response to the SCP 23 at step 234, enabling the SCP 23 to further process the call routing determination. Based on the processing, the SCP 23 instructs the SSP 24 at step 236 on where to route the suspended call. For example, in the incoming call monitor example, the SCP 23 instructs the SSP 24 to route the call to a voice mail number when the calling party says (or presses) "three." In the language selection example, the SCP 23 instructs the SSP 24 to route the call to a directory number associated with a Spanish speaking version of a particular service when the calling party says (or presses) "two."

According to the exemplary call flow of FIG. 2A, the SCP 23 instructs the SSP 24 to connect the call to the subscriber telephone 25, indicated by step 238. Any caller data received through the speech recognition functionality that must be stored (e.g., data enabling customized reports, such as call detail records) may be stored in an applicable database, such as the SCP 23. In an embodiment of the invention, the SCP 23 stays in contact with the SSP 24 for the duration of the call to be able to provide additional routing instructions, either during or after the call. For example, the SCP 23 may receive a mid-call trigger or an end-of-call signal indicating that the calling party wants to proceed to another service or destination.

Depending on the AIN service being implemented, the VXML platform 40 may provide additional scripts, or additional dialogs within the same script, following steps 230 and 232, based on the calling party's initial response. The additional exchanges with the calling party may occur in accordance with the documents initially retrieved from the document/application server 47, or pursuant to additional instructions from the SCP 23 initiating another application. For example, when the calling party selects option "one" to input an override PIN, in the incoming call monitor example, the application may direct the VXML platform 40 to play another voice message (or to retrieve a document that includes another voice message) requesting the calling party to enter the override PIN. In response, the calling party enters the PIN, which is compared to at least one PIN associated with the subscriber. The VXML platform 40 may make the PIN comparison, based on information received from the SCP 23, and notify the SCP 23 at step 234 whether there is a match. Alternatively, the SCP 23 may make the PIN comparison based on the PIN being forwarded to the SCP 23 at step 234. Regardless, when the PIN is verified, the SCP 23 determines the appropriate call routing (e.g., terminating the call at the subscriber telephone 25).

The call routing may include a variety of intelligent call routing applications, alone or in combination with the voice interactions enabled by the VXML platform 40, such as origin-dependent call routing (ODR), time-dependent call routing (TDR) and percent allocation routing (PAR). Using ODR, the SCP 23 provides instructions for routing calls based on an indication of call origin, such as the calling party's directory number, area code and/or exchange, zip code or other location specific data. Using TDR, the SCP 23 considers the time of the call among the factors for determining how to handle the call. PAR indicates alternate terminating locations based on a total number of calls to a directory number or set of directory numbers (e.g., a toll free number associated with a subscriber). Notably, as indicated above, the invention supports any kind of AIN service or intelligent call routing, and examples of applications are merely exemplary, and are not intended to limit the scope or the spirit of the present invention.

Figure 2B:
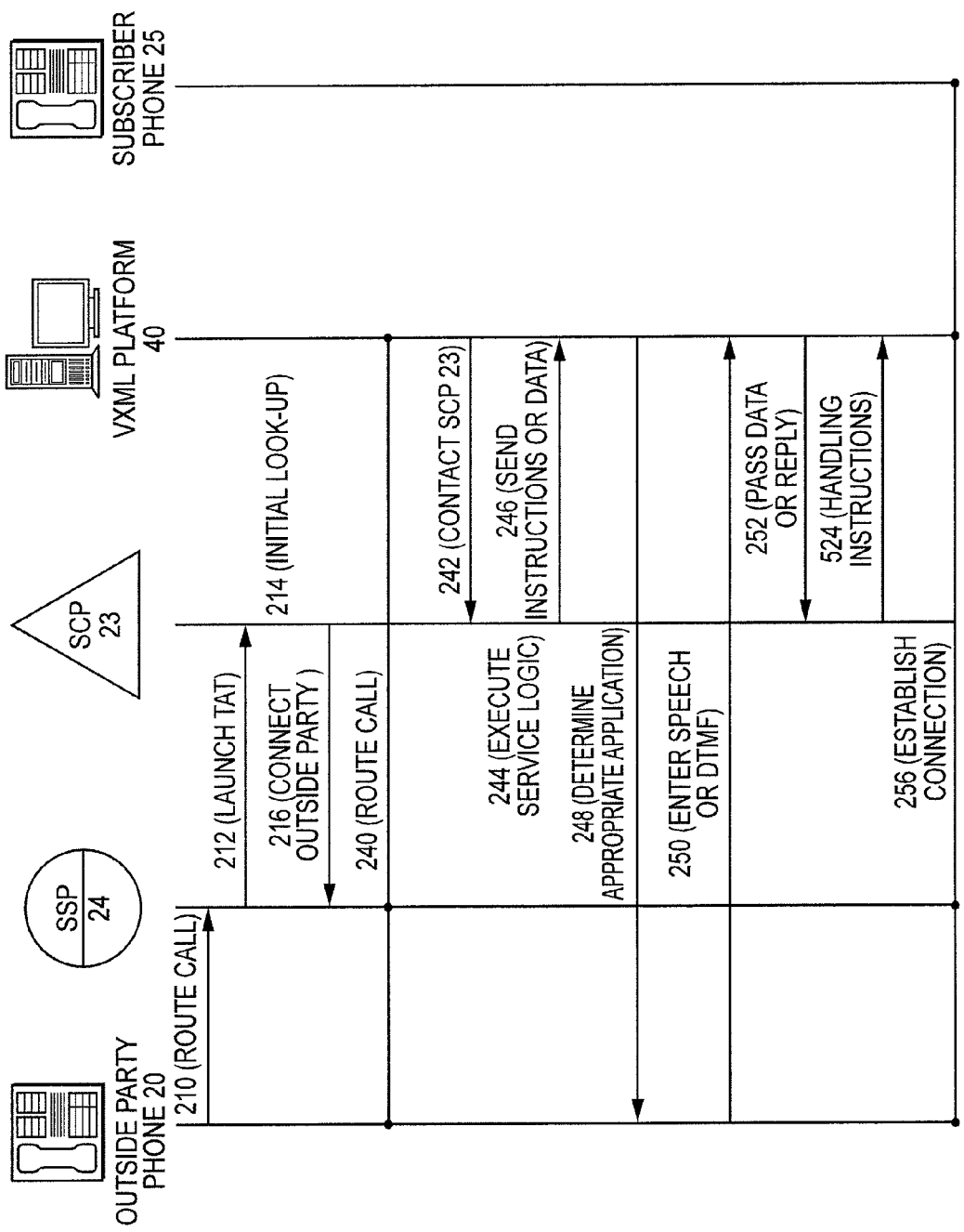
FIG. 2B is an exemplary call flow diagram showing routing of a telephone call to a subscriber telephone in accordance with an AIN service, using a VXML platform, according to an aspect of the present invention.

FIG. 2B depicts essentially the same call routing methodology as that depicted in FIG. 2A, with the exception that the SSP 24 actually routes the calling party to the VXML platform 40, rather than suspending the call and establishing a GR-1129 connection with the VXML platform 40. Therefore, steps 210, 212, 214 and 216 are the same in FIGS. 2A and 2B. However, when the SCP 23 determines that the VXML service is available for the call at step 214, and instructs the SSP 24 to connect the outside party telephone 20 with the VXML platform 40 at step 216, the SSP 24 routes the call to the VXML platform 40, as shown at step 240, using SS7 signaling, RLT or the like. In other words, the call is no longer suspended at the SSP 24. Therefore, any additional call routing, as determined by the SCP 23, requires the initiation of another, related call, discussed below.

Once the SSP 24 terminates the connection at the VXML platform 40, the VXML platform 40 contacts the SCP 23, through the intranet 50, at step 242. As described above, the SCP 23 executes the service logic associated with the subscriber's AIN service at step 244. The specific service or services to be invoked may be identified based on the called party number, or other unique subscriber related identification information passed to the SCP 23 from the VXML platform 40. The SCP identifies the relevant instructions or data at step 244, which are sent to the VXML platform 40 through the intranet 50 at step 246. The instructions or data enable the VXML interpreter 42 of the VXML platform 40 to determine the appropriate application, including the script to be provided to the calling party at step 248. The calling party enters a reply, either by speech or DTMF input, at step 250. The VXML platform 40 passes the calling party's reply, or data related to the reply, to the SCP 23 at step 252 for processing in accordance with the AIN service.

At step 254, the SCP 23 instructs the VXML platform 40 on how to handle the call based on the AIN processing. The SCP 23 instructs the VXML platform 40, as opposed to the SSP 24, because the call is not suspended at the SSP 24 awaiting instructions. In the exemplary call flow of FIG. 2B, the SCP 23 instructs the VXML platform 40 to complete the call to the subscriber telephone 25. Because the call has not been suspended at the SSP 24, the VXML platform 40 must first route the call to the SSP 24 in the PSTN 27, which subsequently establishes a connection with the subscriber telephone 25 using a two B-channel transfer, a release link transfer, a tied-up connection, or the like, as indicated by step 256. In an embodiment of the invention using VoiceXML programming, the application may include a transfer function to connect the call to a third party directory number, such as the subscriber telephone 25. VoiceXML recognizes a bridge transfer and a blind transfer. A bridge transfer enables the calling party to resume a session with the VXML platform 40 after the call with the third party directory number is disconnected. A blind transfer disconnects the VXML platform 40 once the call is transferred.

Figure 3:
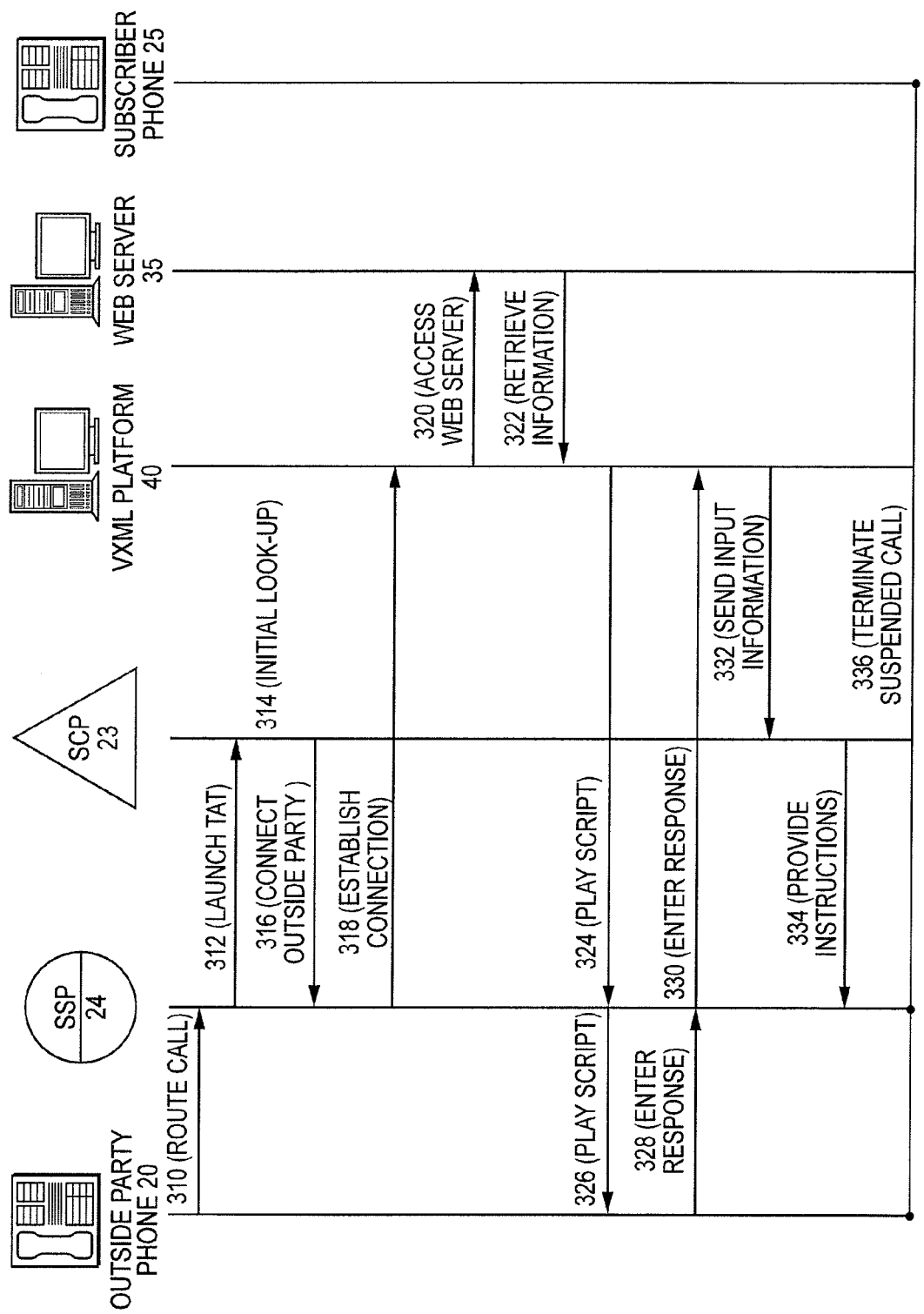
FIG. 3 is an exemplary call flow diagram showing routing of a telephone call to a subscriber telephone in accordance with an AIN service, using a VXML platform and a web server, according to an aspect of the present invention.

FIG. 3 is an exemplary call flow that is similar to FIG. 2A, with the exception of the VXML platform 40 retrieving data from a web server in the Internet 60, such as the web server 35, in order to identify data and determine scripts to be played to the calling party relating to the AIN service. Steps 310-318 of FIG. 3 are the same as the corresponding steps 210-218 of FIG. 2A, resulting in the call being suspended at the SSP 24 and a GR-1129 connection being established between the SSP 24 and the VXML platform 40 at step 318. At step 320, rather than query the SCP 23 for data relating to the AIN service, the VXML platform 40 accesses the web server 35, through the firewall 61 and the Internet 60. In the depicted embodiment of the invention, the web server 35 includes data relating to the subscriber and the AIN services being implemented. The web server 35 may further include the applications and actual scripts to be played to the calling party at steps 324 and 326, discussed below. By including this data on the web server 35, the load on the SCP 23 is reduced. Also, because the VXML platform 40 includes a browser, it is able to actively search for information throughout the Internet 60 pursuant to certain applications. Another advantage is the ease with which the subscriber may access the web server 35 to create customized menus and forms for selected AIN applications, which is discussed further below.

The connection between the VXML platform 40 and the web server 35 may be a well known socket connection over TCP/IP, for example, using HTTP. Although the VXML platform 40 is essentially an audio browser, the communication between the VXML platform 40 and the web server 35 is the same as a conventional web client/server communication, as far as the web server 35 is concerned. In other words, the web server 35, identified through an associated uniform resource locator (URL), receives HTTP requests from the VXML platform 40 and serves HTML or XML documents in response. The documents may include voice markups, which are the scripts interpreted by the VXML platform 40. The voice markups may be converted into audio data, through the text-to-speech engine 45, and passed to the subscriber at steps 324 and 326. HTML documents may be reformatted to include voice markups, for example, by a conversion application at the document/application server 47.

The information provided by the web server 35 is retrieved by the VXML platform 40 at step 322. When the information includes AIN service data, the VXML interpreter 42 determines the appropriate applications in the same manner as described with respect to FIG. 2A, above. The VXML platform 40 plays the associated scripts to the calling party, through the GR-1129 connection with the SSP 24, at steps 324 and 326. When the information retrieved from the web server 35 includes the actual scripts, the VXML platform 40 simply plays the scripts as received, through the text-to-speech engine 45 or the speech objects engine 46, as discussed above, depending on the received format.

The calling party enters a response to each script, through the GR-1129 connection at steps 328 and 330, using voice or DTMF input. Information relating to the calling party's input is sent from the VXML platform 40 to the SCP 23 at step 332 though the intranet 50. As discussed above, the SCP 23 provides instructions to the SSP 24 at step 334, regarding call routing in response to the received information. In the exemplary call flow of FIG. 3, the SCP 23 instructs the SSP 24 to terminate the previously suspended call at the subscriber telephone 25, indicated by step 336.

Figure 4:
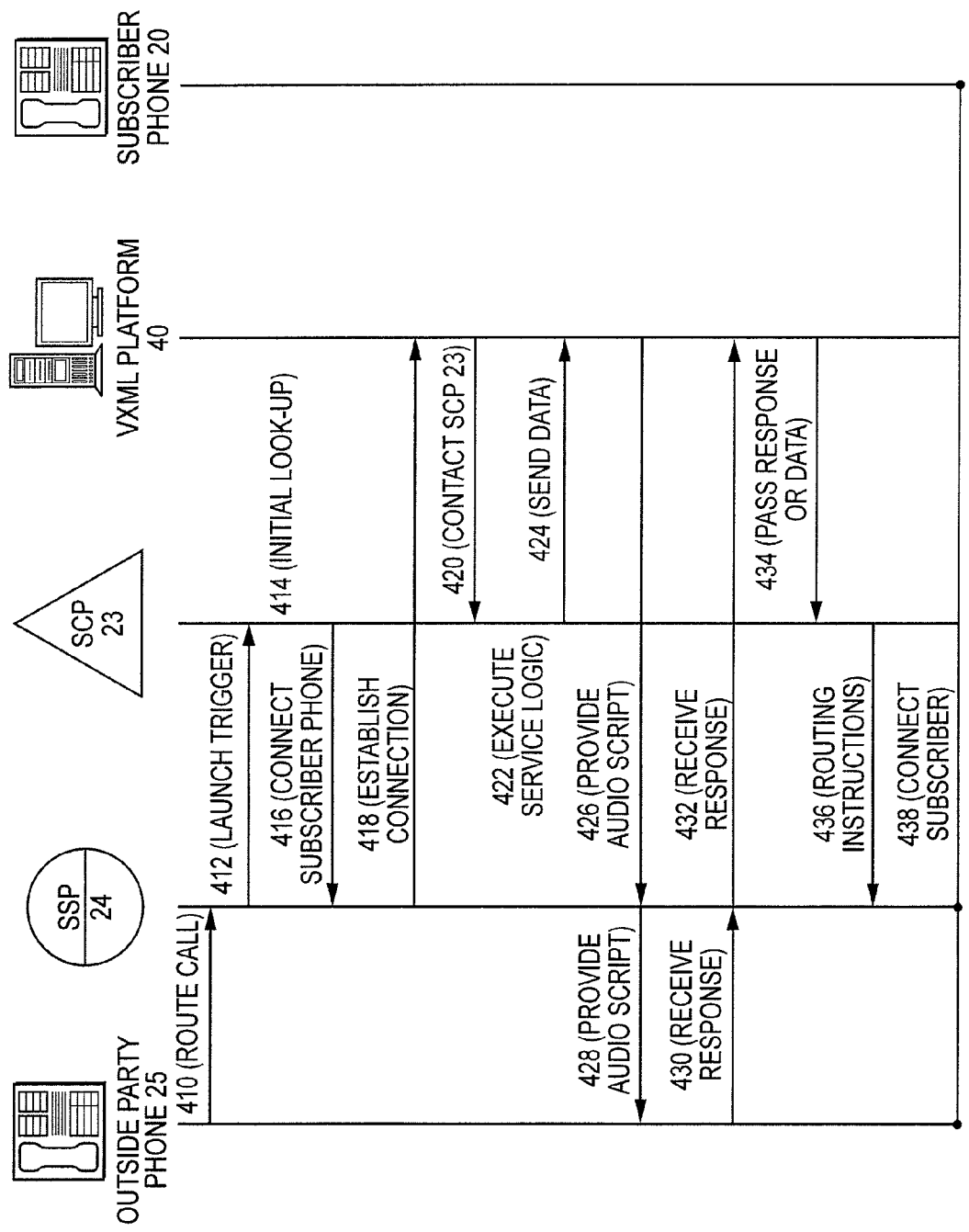
FIG. 4 is an exemplary call flow diagram showing routing of a telephone call from a subscriber telephone in accordance with an AIN service, using a VXML platform, according to an aspect of the present invention.

FIGS. 2A, 2B and 3 depict exemplary embodiments of the invention in which calls are placed from the outside party telephone 20 to the subscriber telephone 25 (i.e., incoming calls). In contrast, FIG. 4 depicts an exemplary embodiment in which calls are placed from the subscriber telephone 25 to the outside party telephone 20 (i.e., outgoing calls), which incorporate a similar process. In particular, FIG. 4 depicts an outgoing call in which the VXML platform 40 is connected to the subscriber party telephone 25 through a GR-1129 protocol signaling connection, while the call is suspended at the terminating switch, the SSP 24.

The steps of FIG. 4 are applicable to any AIN service that is triggered by the subscriber's originating switch, such as outgoing call monitor, an example of which is described in U.S. patent application Ser. No. 09/983,303, filed Oct. 24, 2001, entitled "System and Method for Restricting and Monitoring Telephone Calls" in the names of Nancy A. Book et al. To invoke the VXML platform 40, a calling party (e.g., the subscriber) initiates a call from the subscriber telephone 25 to the outside party telephone 20, for example, by dialing the outside party's directory number. The call is routed to the originating SSP 24 at step 410. The SSP 24 launches a trigger (e.g., an off-hook delay trigger (OHD) trigger), which includes at least the calling party number and the called party number, via the SS7 network and the appropriate STP 22 (not pictured in FIG. 4) to the subscriber's serving SCP 23 at step 412. Although the call flow depicted in FIG. 4 includes an exemplary OHD trigger to initiate communications with the SCP 23, it is understood that any other initiating AIN trigger may be used, including terminating switch triggers (discussed above) and mid-call triggers.

At step 414, the SCP 23 performs an initial look-up at the subscriber database 28 to determine whether the subscriber is entitled to VXML supported AIN services, based on the calling party number (i.e., the subscriber directory number), for example. The VXML capability may be separately available to the subscriber or it may be packaged with another AIN service to which the subscriber subscribes. When the SCP 23 determines that the VXML service is available for the call, the SCP 23 instructs the SSP 24 at step 416 to connect the subscriber telephone 25 with the VXML platform 40. The SSP 24 establishes the connection in accordance with GR-1129 protocol at step 418. In other words, the SSP 24 suspends the call, while setting up a temporary audio channel with the VXML platform 40.

Once the connection is established, the VXML platform 40 recognizes the relationship to AIN services and contacts the SCP 23, through the intranet 50, at step 420. At step 422, the SCP 23 executes the service logic associated with the subscriber's AIN service. The specific service or services to be invoked may be identified based on the called party number, or other unique subscriber specific identification information passed to the SCP 23 from the VXML platform 40. In an alternative embodiment, step 422 may be executed in conjunction with step 414. In other words, the SCP may determine and execute the appropriate service logic, and retrieve and send the relevant data to the VXML platform 40, based on the initial query received from the SSP 24 at step 412. An advantage of the alternative embodiment is that the VXML platform 40 will not need to initially query the SCP 23 upon establishment of the GR-1129 connection with the SSP 24. It will already have the relevant call service data and will be anticipating the imminent connection at step 418. The processing performed by the SCP 23 at step 422 may include, for example, determining whether an AIN service is ON or OFF and determining whether any ancillary functions are activated, such as screening lists or weekly schedules.

Assuming the AIN service is active, the SCP 23 sends the relevant data to the VXML platform 40 through the intranet 50 at step 424. The data enables the VXML interpreter 42 of the VXML platform 40 to identify the application and corresponding scripts to be provided to the caller. For example, the data received from the SCP 23 may identify the subscriber directory number as being associated with an outgoing call monitoring service. The data may further indicate that the called party number is not on a priority screening list, so that the call will not be connected to the outside party telephone 20 unless the subscriber enters an acceptable override PIN. The VXML platform 40 is therefore instructed by the SCP 23 (or determines through its own processing logic) that a script must be played to the subscriber requesting entry of a PIN. As described with respect to FIG. 2A, the script may be based on data retrieved from the VXML document/application server 47 or the web server 35, using the text-to-speech engine 45 or the speech objects engine 46.

The audio script is provided to the subscriber at the subscriber telephone 25 by way of the GR-1129 connection with the SSP 24 at steps 426 and 428. The subscriber responds verbally or by DTMF input, typically selecting one of multiple options. When the calling party selects an option, the VXML platform 40 receives the response through the GR-1129 connection through the SSP 24 at steps 430 and 432. The VXML platform 40 then passes the subscriber's response, or data relating to the response, to the SCP 23 at step 434, so that the SCP 23 can further process the call routing. Based on the processing, the SCP 23 instructs the SSP 24 at step 436 on where to route the suspended call. According to the exemplary call flow of FIG. 4, the instructions include connecting the subscriber telephone 25 and the outside party telephone at step 438. The call may be forwarded to the terminating SSP 21 (not pictured) directly or through a number of intervening switches in the PSTN 27, either based on further instruction from the SCP 23 or through normal translations.

Similar to the call flow of FIG. 2B, depicting calls placed to the subscriber telephone 25, calls placed from the subscriber telephone 25 may incorporate routing the caller to the VXML platform 40 to enable communications between the VXML platform 40 and the subscriber telephone 25, as opposed to suspending the call at the SSP 24 and enabling communication through GR-1129 signaling. Likewise, similar to the call flow of FIG. 3, depicting calls placed to the subscriber telephone 25, calls placed from the subscriber telephone 25 may invoke the VXML platform 40 to access a web server in the Internet 60 (e.g., web server 35) to obtain AIN service related data for determining call routing. Because the steps relating to the call routing process for originating calls at the subscriber telephone 25 are essentially the same as those for receiving calls at the subscriber telephone 25 (shown in FIGS. 2B and 3), they are not discussed again.

Figure 5:
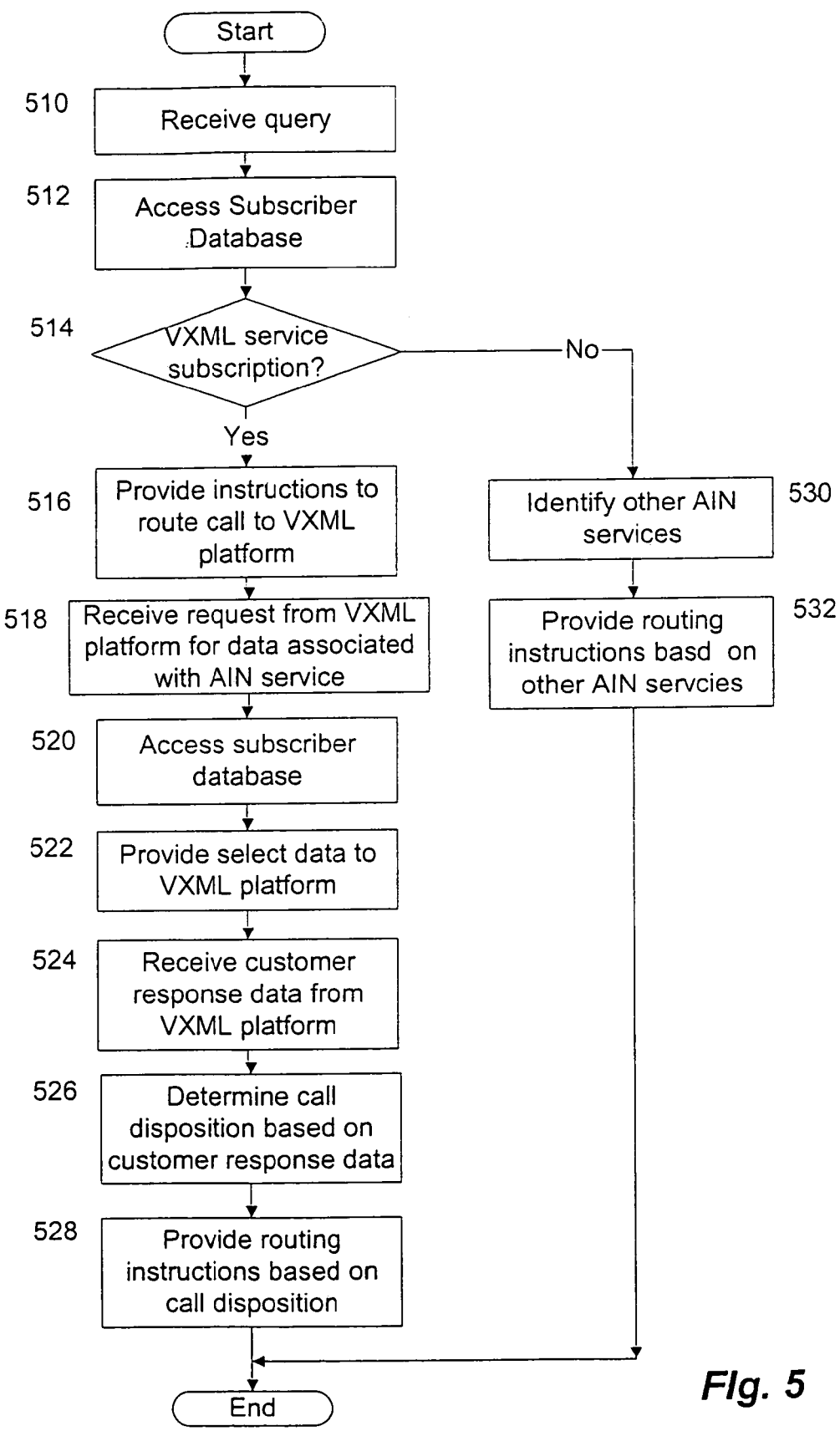
FIG. 5 is a flowchart of exemplary SCP service logic for routing a telephone call to or from a subscriber telephone in accordance with an AIN service, using a VXML platform, according to an aspect of the present invention.

FIG. 5 is a flowchart showing exemplary service logic of the SCP 23 for routing a telephone call to or from the subscriber telephone 25 in accordance with an AIN service. As shown, the high level processing steps are the same for controlling the interaction between the VXML platform 40 and the calling party, regardless of whether the call is originating or attempting to terminate at the subscriber telephone 25, and regardless of the specific features of the applicable AIN service. Therefore, as in the cases of the preceding FIGS. 2A-4, any specific applications discussed with respect to FIG. 5 are merely exemplary and are not intended to limit the scope of the invention.

At step s510 of FIG. 5, the SCP 23 receives a query from the SSP 24, either in its capacity as a terminating end office sending a TAT or an originating end office sending an OHD trigger. The query includes data relating to the call, including the calling party number and the called party number. The SCP 23 accesses a subscriber database at step s512, based on the calling party number or the called party number to determine whether the calling party number or the called party number is associated with an AIN-based VXML service at step s514. The SCP 23 accesses the database using any compatible database interface, such as SR-3511 or SR-3389. The database may be, for example, the subscriber database 28. The same database may also include additional AIN services based on the query data, including AIN services associated with outgoing calls, as well as AIN services associated with incoming calls. The SCP 23 therefore may identify any additional AIN services to which the calling party and the called party are entitled at the time it determines whether VXML services are available. Alternatively, the SCP 23 identifies the additional AIN services after being queried by the VXML platform 40 at step s520, discussed below.

When the SCP 23 determines that neither the calling party number nor called party number is entitled to a VXML AIN service, the SCP 23 identifies any other AIN services to be involved in processing the call at step s530. At step s532, the SCP 23 conventionally provides routing instructions to the SSP 24 based on the identified AIN services, without invoking the VXML platform 40.

When the SCP 23 determines that a VXML service is involved, it instructs the SSP 24 to establish a connection with the VXML platform 40 at step s516. As discussed above, the SSP 24 either suspends the call and establishes a GR-1129 connection with the VXML platform 40 for the duration of the communication between the calling party and the VXML platform 40, or routes the call using conventional signaling (e.g., SS7 signaling) through the switch 43 to the VXML platform 40. The end result is the same: the calling party is able to receive audio scripts (e.g., menus, forms, instructions) from the VXML platform 40 and provide voice and/or DTMF responses.

When the VXML platform 40 receives the connection from the SSP 24, it establishes a connection through the intranet 50 with the SCP 23, using an appropriately enabling protocol, such as TCP/IP, TCAP over TCP/IP, SIP, HTTP or the like. The SCP 23 receives a query from the VXML platform 40 at step s518, including the directory number (e.g., the calling party number or the called party number) that is entitled to the VXML AIN service. Based on the received directory number, the SCP 23 accesses the subscriber database at step s520 to identify the subscriber's associated AIN services and to identify the information needed to determine the call routing. When the information includes data that must be provided by the calling party, the SCP 23 instructs the VXML platform 40 to obtain the data at step s522. The SCP 23 looks up the relevant subscriber data in the subscriber database 28, using any compatible database interface, such as SR-3511 or SR-3389. The information identified by the SCP 23 at step s520 may include, for example, determining whether the directory number is associated with a particular AIN service, whether the AIN service is active according to a time of day, day of week schedule, and whether the called party number or the calling party number is on a priority or restriction list.

The instructions vary in complexity, depending on how centralized execution of the AIN services are to the SCP 23. For example, the SCP 23 may broadly identify the data that it needs for making routing determinations, allowing the VXML platform 40 to determine how to obtain the data from the calling party. In a more centralized system, however, the SCP 23 may particularly identify an application that the VXML platform 40 is to execute. In yet another embodiment, the SCP 23 is more tangential to the VXML platform 40, in that the VXML platform 40 invokes the AIN service logic associated with the directory number and determines whether data must be retrieved from the SCP 23 to process the call. When data is needed, the VXML platform 40 queries the SCP 23 or the subscriber database 28 for the data at step s518.

Ultimately, the data provided by the SCP 23 to the VXML platform 40 at step s522 enables the VXML platform 40 to verbally communicate with the calling party, through VXML scripts and speech recognition or DTMF input, by way of the SSP 24. The calling party's responses are received by the VXML platform 40 and corresponding data is passed to the SCP 23 at step s524 through the intranet 50. In an embodiment of the invention, the VXML platform 40 processes the calling party's responses prior to passing data to the SCP 23 to determine the data to be passed to the SCP 23 and to decide whether additional voice communications must be executed. For example, an initial menu may ask the calling party to select from a series of choices, at least one which requires the VXML platform 40 to obtain additional information. In the exemplary incoming call monitoring service, for instance, the calling party may be asked to select among entering an override PIN, being forwarded to a voice mail number or terminating the call. When the calling party elects to enter an override PIN, the VXML platform 40 may automatically follow-up with a script requesting the PIN without having first to forward the calling party's selection to the SCP 23 to receive additional instructions to play the subsequent script.

At step s526, the SCP 23 determines the final call disposition based, at least in part, on the data received from the VXML platform 40 at step s524. The disposition may include routing the call to a destination directory number (which may or may not be the called party number), routing the call to a service related number, such as a voice mail service, or disconnecting the call. As discussed above, the SCP 23 may determine that additional information is needed from the calling party, and instructs the VXML platform 40 to collect the information, resulting in the repetition of steps s522 and s524. The SCP 23 may also store call data associated with the final call disposition, for administrative purposes, such as billing, report generation and historical record keeping. The call data may be stored in an external database, which reduces the data storage burden on the SCP 23.

When the SCP 23 has determined the final call disposition, it provides instructions at step s528 to the SSP 24 or to the VXML platform 40 to route the call. In particular, when the call has been suspended at the SSP 24, and the connection between the calling party and the VXML platform 40 is a GR-1129 connection, the SCP 23 passes the routing instructions to the SSP 24 through the SS7 signaling network at step s528. When the call has been routed to the VXML platform 40 to enable the connection between the calling party and the VXML platform 40, the SCP 23 passes the routing instructions to the VXML platform through the intranet 50. The SSP 24 or the VXML platform 40 accordingly invokes the final disposition, as instructed.

Figure 6:
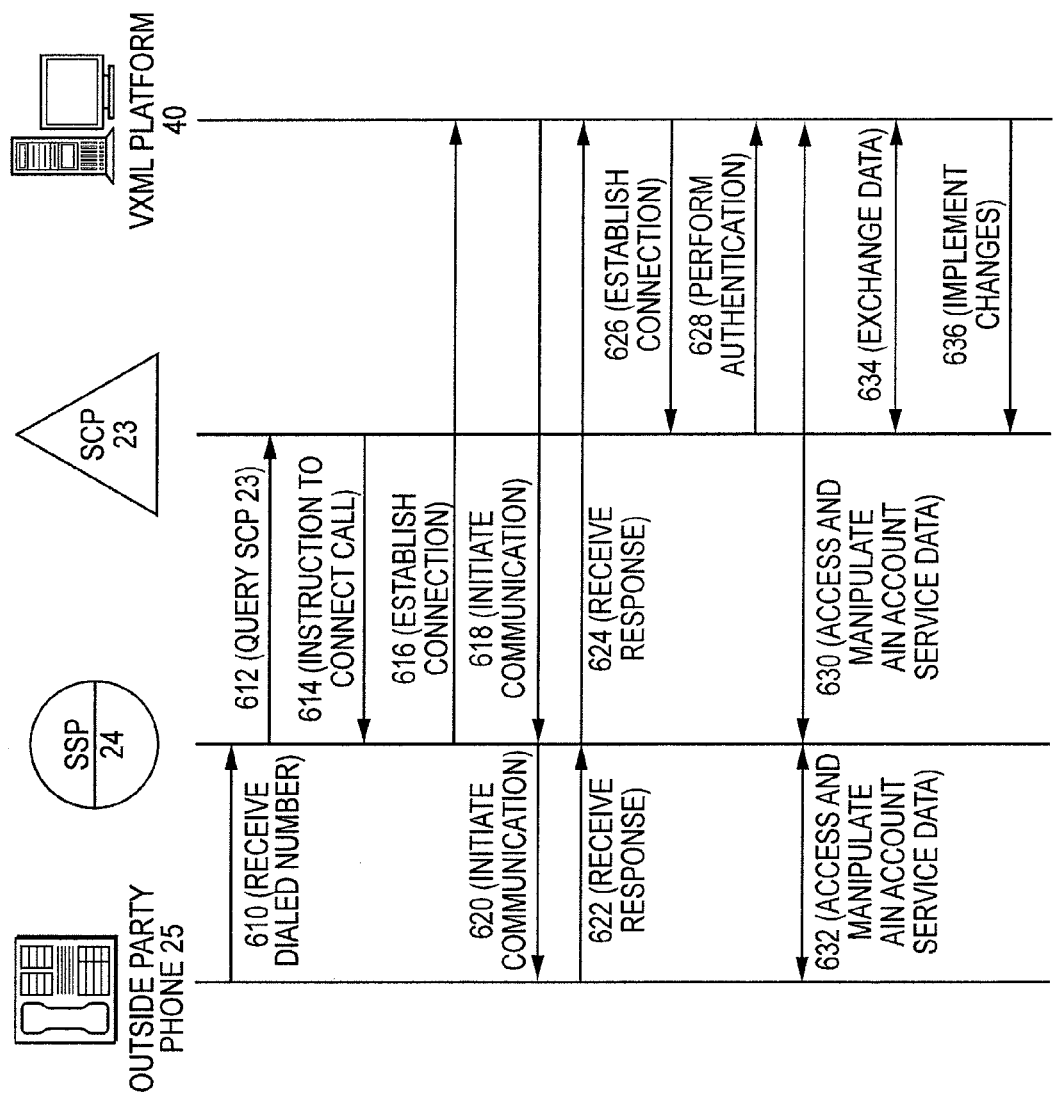
FIG. 6 is an exemplary call flow diagram showing updating subscriber data from a subscriber telephone in accordance with an AIN service, using a VXML platform, according to an aspect of the present invention.

In addition to enabling call routing processing by the SCP 23, the VXML platform 40 enables the subscriber to interface with the AIN service, including reviewing and updating the subscriber's AIN data. Referring to FIG. 6, the subscriber simply dials a directory number associated with the VXML platform 40 from any telephone, including the subscriber telephone 25. The subscriber may dial a toll-free number, e.g., an 800 number or local service provider number, or a vertical service code, such as *96, which the SSP 24 has been programmed to route to the VXML platform 40. FIG. 6 depicts the subscriber accessing the VXML platform 40 from the subscriber telephone 25.

At step 610, the SSP 24 receives the number dialed at the subscriber telephone 25. The SSP 24 suspends the call and queries the SCP 23 at step 612 based, for example, on a OHD trigger, including the calling party number and/or the dialed number. In response, the SCP 23 instructs the SSP 24 at step 614 to connect the call with the VXML platform 40. In an alternative embodiment, the SSP 24 may simply route the call to the VXML platform 40, through normal translations, based on the dialed number, without intervening instructions from the SCP 23. The call may routed through additional switches in the PSTN 27, if necessary.

At step 616, the SSP 24 establishes the connection to the VXML platform 40 through the switch 43 in the same manner as discussed above with respect to FIGS. 2A and 2B. In particular, the SSP 24 either suspends the call and establishes a temporary GR-1129 connection with VXML platform 40 or routes the call through normal switching to the VXML platform 40. In the exemplary embodiment depicted in FIG. 6, the SSP 24 suspends the call and sets up the GR-1129 protocol connection, without actually routing the call to the VXML server 40. The GR-1129 connection enables the VXML platform 40 to perform the speech prompting and recognition functions, to enable interaction between the caller and the SCP 23, and to return control of the call to the SSP 24 and the SCP 23 without having to place an outbound call or remain in the circuit.

Once the connection is established, the VXML platform 40 initiates communication with the subscriber telephone 25 at steps 618 and 620 according to an initial application retrieved, for example, from the document/application server 47. For example, the VXML platform 40 may initially prompt the subscriber to enter an account number, along with a password or PIN. The subscriber responds by either speaking into the subscriber telephone 25 or depressing the DTMF keys. The VXML platform 40 receives the response at steps 622 and 624 and authenticates the subscriber through one of a number of alternatives. For example, the VXML platform 40 may establish a connection with the SCP 23 through the intranet 50 at step 626 and retrieve the authentication data associated with the subscriber's account to perform the authentication based on the entered data at step 628. Alternatively, the VXML platform 40 may pass the authentication data to the SCP 23, which performs the authentication and returns an approval or disapproval signal to the VXML platform 40 at step 628.

The VXML 40 may also be programmed to perform the authentication without accessing the SCP 23, which reduces the load on the AIN. For example, the VXML platform 40 may include or have access to an authentication/subscription information database that stores authentication information relating to each subscriber's account. The VXML platform 40 accesses the database, compares the stored data with the subscriber's initial responses, and proceeds with the call upon successful authentication, or otherwise terminates the connection. The VXML platform 40 may first play another script advising the caller that the account number and/or PIN are incorrect and that the call will be terminated. Also, the subscriber may be given another opportunity to enter the correct data. In an embodiment of the invention involving voice recognition, discussed above, the authentication is performed based upon the subscriber's voice print received by the speech recognition engine 44, eliminating the need for a password or PIN.

Upon successful authentication, the subscriber has the ability to perform any number of administrative and operational functions, such as changing or adding PINs and passwords, toggling the AIN services ON and OFF and activating or deactivating customized lists and schedules through the VXML platform 40. Depending on the AIN services involved and the intent of the subscriber, accessing and manipulating AIN account service data may require multiple exchanges between the subscriber and the VXML platform 40, indicated generally by steps 630 and 632. The substance of the voice interaction is dictated by the call service data in the subscriber's AIN account or accounts, as well as any related call services implemented through a consolidated service, such as PCM, discussed above.

When the subscriber's call service data is stored in the SCP 23, the VXML platform 40 retrieves the status and service information from the SCP 23 through the intranet 50. Again, depending on the AIN service involved and the intent of the subscriber, the call may require a number of exchanges between the SCP 23 and the VXML platform 40, generally indicated by the step 634. In alternative embodiments, the VXML platform 40 may retrieve the call service data from the SCP 23 through an interface with the subscriber database 28, without first passing through the SCP 23. To the extent call service data is stored at a local database, the VXML 40 may retrieve the call service data without traversing the intranet 50. Also, as discussed in detail below, the VXML platform 40 may retrieve the call service data from a web server or database server outside the intelligent network of the PSTN 27, such as the web server 35.

Based on the status and call service data, the VXML platform 40 plays scripts (e.g., menus and forms) and receives verbal or DTMF responses from the subscriber, through the GR-1129 connection at steps 630 and 632. For example, a subscriber having multiple AIN services may wish to update an FCF service, in particular. After accessing the VXML platform 40 and being authenticated, according to steps 610 through 628, the subscriber is provided scripts from the VXML platform 40 based on data retrieved from the SCP 23, as indicated by steps 630 and 632. The initial script may identify all of the AIN services to which the subscriber currently subscribes and request the subscriber to select one. Upon receiving the selection, the VXML platform 40 retrieves an application from the VXML document/application server 47 and plays a script that reflects the available options for interacting with the service. For example, the VXML platform 40 may play the following menu: "Please say 'one' to turn your call forwarding ON; 'two' to activate your weekly schedule; 'three' to activate your priority screening list; or 'four' to amend your call forwarding options." Alternatively, a form may state the following: "Please say 'on' to turn your call forwarding ON; 'schedule' to activate your weekly schedule; 'screening list' to activate your priority screening list; or 'options' to amend your call forwarding options."

Of course, the VXML platform 40 would properly reflect the current state of the AIN service, as indicated by the SCP 23. Therefore, in the present example, if the call forwarding functionality is already ON, and the weekly schedule and the priority screening list are already active, the menu played by the VXML platform 40 would provide the following: "Please say 'one' to turn your call forwarding OFF; 'two' to deactivate your weekly schedule; 'three' to deactivate your priority screening list; or 'four' to amend your call forwarding options."

The input from the subscriber populates a response field of the VXML script. For example, when the subscriber selects one of the options one through three, above, the VXML platform 40 forwards the selection to the SCP 23 at step 634, which immediately updates the call service data at the subscriber database 28 and begins to implement the change. The VXML platform 40 also provides the subscriber an opportunity to conduct additional updates to the FCF service, as well as the other AIN services. When the subscriber selects exemplary option four, the VXML platform 40 links to a related FCF form to identify the call forwarding options that may be amended: "Please say 'one' to change your 'forward-to' number; 'two' to change your weekly schedule; and 'three' to change your priority screening list." The subscriber's selection of each of these options results in the VXML platform 40 playing a follow-on script directed at eliciting the information to update the service. Each of the follow-on scripts, including the related FCF menu, are associated with other documents in the document/application server 47 and identified through a corresponding URI.

When the exchange is complete, the subscriber is given the option to hang-up or, because the call is suspended at the SSP 24, to have the call forwarded to another directory number. As discussed above, a directory number entered by the subscriber is passed to the SCP 23 through the intranet 50, so that the SCP 23 may instruct the SSP 24 accordingly. In the embodiment where the call is not suspended at the SSP 24, but has been routed to the VXML platform 40, the call may be transferred by the VXML platform 40 to another directory number identified by the subscriber, in the manner described above.

Changes made by the subscriber to the status of the AIN service and to the call service data are transmitted to and stored in the appropriate database, e.g., the SCP 23 and/or the subscriber database 28, for immediate implementation at step 636. Furthermore, the subscriber's spoken input may be recorded for future reference. For example, the subscriber may wish to review the current AIN service settings, such as a forward-to directory number. In an embodiment of the invention, rather than simply retrieving digitally stored numbers and generating synthesized speech to communicate the numbers to the subscriber, the VXML platform 40 may retrieve the information as a previously recorded audio file and provide the information in the subscriber's own voice. The SCP 23 is subsequently updated, for example, upon completion of the call or at predetermined intervals of time, for immediate implementation.

Figure 7:
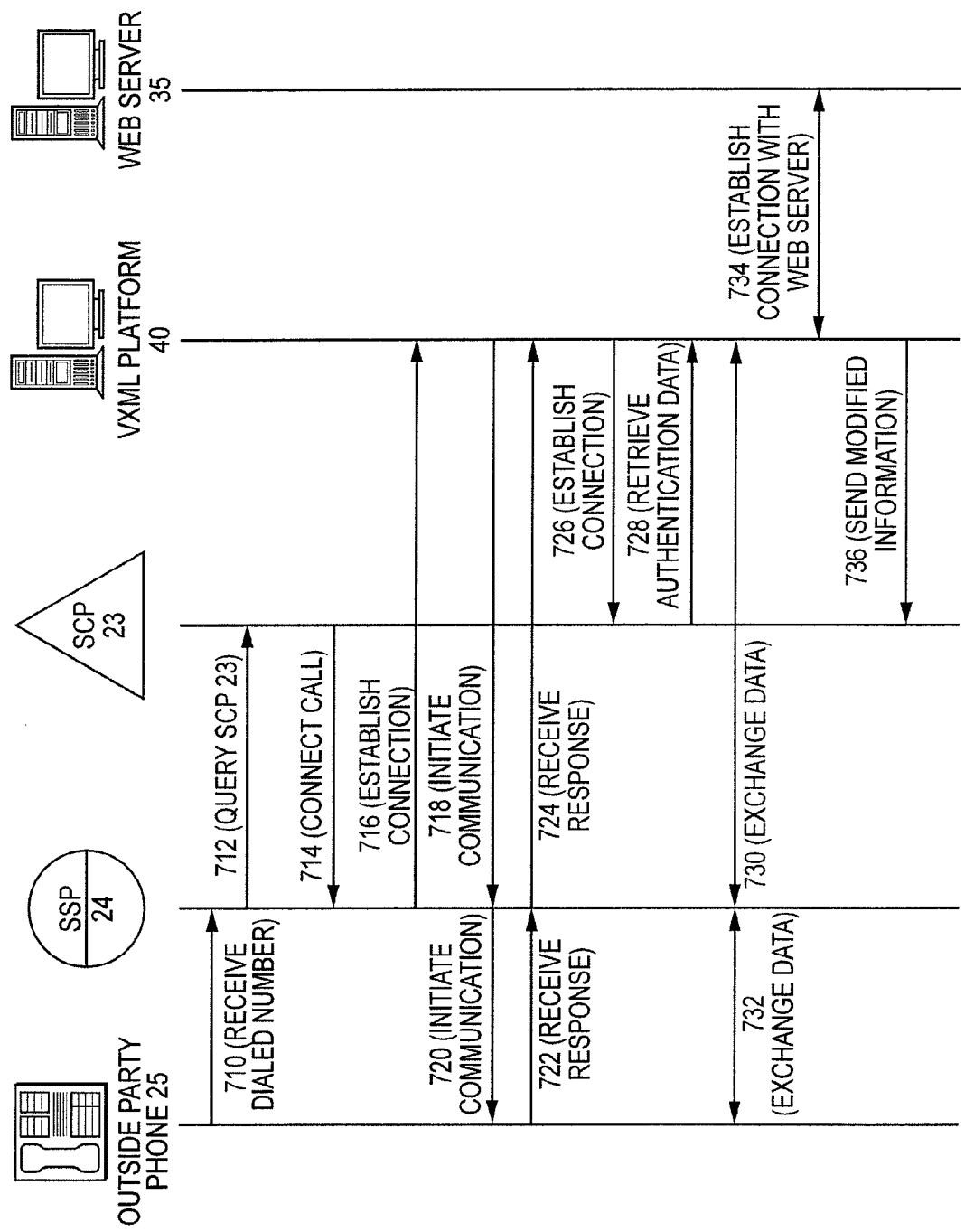
FIG. 7 is an exemplary call flow diagram showing accessing a web server from a subscriber telephone in accordance with an AIN service, using a VXML platform, according to an aspect of the present invention.

FIG. 7 depicts another embodiment for enabling the subscriber to interface with the AIN service, including reviewing and updating the subscriber's AIN data, which involves accessing a web server through the Internet 60. In the same manner as shown in FIG. 6, the subscriber dials the directory number associated with the VXML platform 40 from any telephone, including the subscriber telephone 25. At step 710, the SSP 24 receives the number dialed at the subscriber telephone 25 and suspends the call. The SSP 24 queries the SCP 23 at step 712 based, for example, on a OHD trigger, including the calling party number and/or the dialed number. In response, the SCP 23 instructs the SSP 24 at step 714 to connect the call with the VXML platform 40.

At step 716, the SSP 24 establishes the connection to the VXML platform 40 through the switch 43 in the same manner as discussed above with respect to FIGS. 2A and 2B. In particular, the SSP 24 either suspends the call and establishes a temporary GR-1129 connection with VXML platform 40 or routes the call through normal switching to the VXML platform 40. As in FIG. 6, the SSP 24 of the exemplary embodiment depicted in FIG. 7 suspends the call and sets up the GR-1129 protocol connection.

Once the connection is established, the VXML platform 40 initiates communication with the subscriber telephone 25 at steps 718 and 720. For example, the VXML platform 40 may initially prompt the subscriber to enter an account number, along with a password or PIN. The subscriber responds by either speaking into the subscriber telephone 25 or depressing the DTMF keys. The VXML platform 40 receives the response at steps 722 and 724 and authenticates the subscriber through one of a number of alternatives. For example, the VXML platform 40 may establish a connection with the SCP 23 through the intranet 50 at step 726 and retrieve the authentication data associated with the subscriber's account at step 728 to perform the authentication. Alternatively, the VXML platform 40 may pass the authentication data to the SCP 23 at step 726, which performs the authentication and returns an approval or disapproval signal to the VXML platform 40 at step 728. In an embodiment of the invention involving voice recognition, discussed above, the authentication is performed based upon the subscriber's voice print.

The VXML platform 40 or the web server 35 may alternatively be programmed to perform the authentication without accessing the SCP 23, which reduces the load on the AIN. For example, in the depicted embodiment, the web server 35 may include the authentication information relating to each subscriber's account. The VXML platform 40 accesses the web server 35, as discussed below, retrieves the authentication information and performs the authentication. Alternatively, the VXML platform 40 may provide the subscriber's input to the web server 35 and subsequently retrieve the results of the authentication performed at the web server 35.

Upon successful authentication, the subscriber has the ability to perform any number of administrative and operational functions at the web server 35, such as changing or adding PINs and passwords, toggling the AIN services ON and OFF, activating or deactivating customized lists and schedules, and creating or editing other service-related data through the VXML platform 40. Depending on the AIN services involved and the intent of the subscriber, accessing and manipulating AIN service data may require multiple exchanges between the subscriber and the VXML platform 40, indicated generally by steps 730 and 732. The substance of the voice interaction is dictated by the call service data in the subscriber's AIN account or accounts, as well as any related call services implemented through a consolidated service, such as PCM.

The VXML platform 40 establishes connection with the web server 35, through the firewall 61 and the Internet 60, at step 734 (unless the connection had previously been established to enable subscriber authentication, described above). The connection between the VXML platform 40 and the web server 35 may be a well known socket connection over TCP/IP, for example, using HTTP. The communication between the VXML platform 40 and the web server 35 is the same as a conventional web client-web server communication, as far as the web server 35 is concerned. In other words, the web server 35 receives HTTP requests from the VXML platform 40 and serves HTML or XML documents in response. As described above, the documents may include voice markups, which are interpreted by the VXML platform 40. The voice markups may be converted into audio data, through the text-to-speech engine 46, and passed to the subscriber at steps 730 and 732. The documents may include the predefined applications, designed to collect specific information from the caller or to lead the caller through a predetermined series of steps (e.g., to modify an AIN service), established in VoiceXML.

In FIG. 7, at least a portion of the subscriber's call service data is stored at or accessible by the web server 35 through the Internet 60. For example, the VXML platform 40 may initially retrieve the status and service information from the SCP 23 through the intranet 50, and subsequently establish a connection with the web server 35 in order to retrieve and modify the call service data, or to retrieve additional call service data. Depending on the AIN service involved and the intent of the subscriber, the call may require a number of exchanges between the VXML platform 40 and the web server 35, generally indicated by the step 734.

In one embodiment of the invention, the subscriber has predefined web pages relating to the AIN service, including associated call service data, and accessible by the web server 35. The web pages may be initially developed using data entered by the subscriber at the web client 30, although the subscriber may also create the web-based call service data through the VXML platform 40. The web server 35 may include all of the information, including the status and service information, that is to be stored at the SCP 23 for implementing the services. The subscriber therefore accesses the web server 35 through the VXML platform 40, retrieves the status and service information and makes modifications, as desired, through scripts generated by the VXML platform 40 in response to documents retrieved from the web server 35. Any information modified by the subscriber is passed to the web server 35 by the VXML platform 40.

Because the modifications to the data affect the execution of the particular AIN service by the SCP 23, the web server 35 subsequently updates the database relied on by the SCP 23, such as the subscriber database 28, with the modified information entered by the subscriber. The web server 35 sends the modified information to the SCP 23 by known networking techniques at step 736. For example, the web server 35 may send the modified information to the SMS 62, connected to the SCP 23 (or the subscriber database 28) through a data network. The SMS 62 serves as an interface between the Internet 60 and the SCP 23. Alternatively, the web server 35 may send the modified information in a data message to an intelligent peripheral (not pictured), which translates the information into SR-3511 protocol, for example, and communicates it to the SCP 23 through a data network. Various interfaces between a web server in the Internet and an SCP are described, for example, in U.S. patent application Ser. No. 10/134,637, filed on Apr. 30, 2002, entitled "Voice Enhancing for Advance Intelligent Network Services" in the names of Susanne M. Crockett et al., the contents of which are expressly incorporated by reference herein in its entirety.

The web server 35 may update the SCP 23 immediately upon receipt of the updated information, at the conclusion of the Internet session with the subscriber, or at predetermined time intervals. In an alternative embodiment, the SCP 23 periodically queries the web server 35 to retrieve call service data for the subscriber, which includes information that had been updated by the subscriber since the previous query. The SCP 23 may retrieve the call service data through the VXML platform 40, as well as through known interfaces between the SCP 23 and the Internet 60, such as the SMS 62 and the IP, discussed above. Regardless, once the SCP 23 has received updated information for the subscriber's AIN service, the SCP 23 implements the updates in the call service data immediately.

In another embodiment of the invention, the subscriber accesses web pages that are not necessarily related to, but are compatible with, the AIN services. The subscriber reviews and enters information on the web pages through the VXML platform 40 to control implementation of the AIN services by the SCP 23. For example, the subscriber may create a web-based calendar, generally used to track business and personal schedules. Because the calendar is web-based, the subscriber is able to access the information using the VXML platform 40, as well as the web client 30. The subscriber may also instruct the web-based calendar to automatically update AIN services in the SCP 23 in response to predetermined entries. For example, when the subscriber indicates a meeting or event at a location other than his regular office, the calendar provides a field for a contact number, which may be a directory number for the alternative location, the subscriber's cell phone or pager, or voice mail. When the date and time of the meeting arrives, the web-based calendar forwards the contact number to the SCP 23, which automatically forwards calls to the subscriber's office number to the contact number.

Referring to FIG. 3 above, the VXML platform 40 may be programmed to access the web-based calendar, pursuant to instructions from the SCP 23, during the course of routing an AIN-triggered call. The VXML platform 40 retrieves the calendar data, including the contact number, and forwards the information to the SCP 23 for making the call routing determinations.

Because the VXML platform 40 includes a voice browser, the subscriber may browse the Internet 60 over the connections indicated by steps 730, 732 and 734 of FIG. 7, while the call is suspended at the SSP 24. The VXML platform 40 may then pass information obtained from the browsing to the SCP 23, which subsequently instructs the SSP 24 to route the call to another destination. For example, the subscriber may browse restaurant web sites through the VXML platform 40, which retrieves telephone numbers associated with restaurants from the exemplary web server 35. The VXML platform 40 passes a selected restaurant telephone number to the SCP 23, which instructs the SSP 24 to route the call to the selected telephone number. Likewise, the subscriber may browse a telephone directory web site to obtain a directory number of another party. Again, the VXML platform 40 retrieves the selected telephone number from the web server 35 and forwards it to the SCP 23 for call routing.

Other applications accessible to the subscriber using the VXML platform 40 may include, for example, accessing web sites for information regarding movie listings, bank accounts, stocks, utility outages, sports scores and the like. Directory numbers from these exemplary web sites may likewise be passed to the SCP 23 for call routing (or database updating). Like other browsers, the VXML platform 40 also enables interactive Internet sessions for the subscriber, such as transferring funds, locking in mortgage rates, buying and selling stocks or any other interactive service accessible over the Internet. It is understood that the examples of applications and services are merely exemplary, and are not intended to limit the scope or the spirit of the present invention.

In another embodiment of the invention, the subscriber accesses web pages according to FIG. 7 and reviews or builds voice messages to be played by the VXML platform 40 to a calling party while processing an incoming or outgoing telephone call. As in the previously described embodiments, the VXML platform 40 establishes a connection with the web server 35, through the firewall 61 and the Internet 60, at step 734. The VXML platform 40 gives the subscriber the option to create, delete or modify AIN service related scripts.

When the subscriber elects to create a script, the VXML platform 40 executes an application and accordingly instructs the subscriber when to speak in order to create a voice portion of the script. The VXML speech recognition engine 44 converts the subscriber's spoken input into text, which the VXML platform 40 sends to the web server 35 via HTTP. To enable the subscriber to listen to the customized script, the web server 35 subsequently serves XML documents, including the voice markups, to the VXML platform 40. Alternatively, the web server 35 may serve HTML documents, which are reformatted into XML, including voice markups, by an application server associated with the VXML platform 40, such as the document/application server 47. The text-to-speech engine 45 converts the data to speech, which is passed to the subscriber at steps 730 and 732 by the VXML interpreter 42. Once the customized script is approved, it will be played in accordance with the appropriate application during telephone call processing. In an alternative embodiment, the customized script spoken by the subscriber is stored in an audio format, such as .WAV or MP3, so that the corresponding document retrieved from the web server 35 and played to a calling party are in the subscriber's voice.

When the subscriber elects to modify or delete a script, the web server 35 serves the XML document, including voice markups, containing the current script to the VXML platform 40. Assuming the script is in a text format, the text-to-speech engine 45 converts the data to speech, which is passed to the subscriber at steps 730 and 732 by the VXML interpreter 42. The subscriber is then given the choice of deleting, keeping or modifying the script (or portions of the script). When the subscriber elects to modify the script, the application indicates when the subscriber is to speak. As described above, the VXML platform 40 sends the voice script to the web server 35 in text or audio format. Once the customized script is approved, the preexisting script is deleted and replaced by the newly created or modified script. The script will be played by the VXML platform 40 in accordance with the appropriate application during telephone call processing.

In alternative embodiments, the subscriber is able to create and modify scripts through any medium capable of transmitting speech, as well as accessing the web server 35 through the Internet 60. For example, the subscriber may access the web server 35 from the web client 30 in order to retrieve and modify scripts that are ultimately played by the VXML platform 40 to a calling party, while processing a telephone call involving AIN services.

According to the invention described herein, telephone calls may be routed in accordance with an AIN-based service and data collected from a calling party through a VXML platform 40. In order to provide information to the VXML platform 40, the calling party is either routed to the VXML platform 40 or connected by a GR-1129 connection, while the call is suspended at the a switch. The VXML platform 40 may also provide data from a web-based network, such as the Internet, to the SCP 23 for call routing processing. Further, the subscriber may update AIN service data or implement AIN services by calling the VXML platform 40. The VXML platform 40 collects information from the subscriber according to scripts and sends the information to the SCP 23 and/or the subscriber database 28 through the document/application server 47 or the web server 35.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

In accordance with various embodiments of the present invention, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for Internet and other packet-switched network transmission (e.g., SIP, TCAP, TCP/IP, HTTP, HTML, XML, VoiceXML, SALT, CORBA) and public telephone networks (e.g., AIN, SS7) represent examples of the state of the art. Such standards are periodically superseded by faster or more efficient equivalents having essentially the same functions. Accordingly, replacement standards and protocols having the same functions are considered equivalents.

What is claimed is:

1. A method for executing a network service provided in a telecommunications network, the method comprising:
    receiving from a web client an announcement that a user can create and change and an announcement identification;
    receiving a message from a call processor at a voice extensible markup language (VXML) platform, the message comprising the announcement identification;
    analyzing the announcement identification to determine a remote announcement location where the announcement corresponding to the announcement identification is stored; and
    retrieving and playing the announcement from the remote announcement location,
    wherein the announcement stored at the remote announcement location can be created or changed by the user without affecting the announcement identification.

2. The method of claim 1, in which the VXML platform comprises an intelligent peripheral (IP) component and a VIMS component.

3. The method of claim 2, further comprising:
    receiving the announcement identification at the IP component;
    encoding the announcement identification so that the IP component recognizes that the VIMS component will process the announcement identification; and
    forwarding the announcement identification to the VIMS component.

4. The method of claim 3, further comprising, at the VIMS component, correlating the announcement identification to the announcement location.

5. The method of claim 4, in which the correlating is based upon a server location identification provided in a user profile.

6. The method of claim 1, in which the remote announcement location comprises a web server.

7. The method of claim 6, in which the web server is identified by a uniform resources locator (URL).

8. The method of claim 1, in which the announcement location comprises a web server, and both the web server and the web client are located behind a firewall.

9. A system for executing a network service provided in a telecommunications network, the system comprising:
    a voice extensible markup language (VXML) platform configured for receiving a message comprising an announcement identification, the VXML platform analyzing the announcement identification to determine a remote announcement location where an announcement corresponding to the announcement identification is stored, and then retrieving and playing the announcement,
    wherein the announcement stored at the remote announcement location can be created or changed by a user utilizing a web client without affecting the announcement identification.

10. The system of claim 9, in which the VXML platform comprises an intelligent peripheral (IP) component and a VIMS component.

11. The system of claim 10, in which the IP component receives the announcement identification and then forwards the announcement identification to the VIMS component,
    the system further comprising a call processor in the telecommunications network configured to encode the announcement identification so that the IP component recognizes that the VIMS component will process the announcement identification.

12. The system of claim 11, in which the VIMS component correlates the announcement identification to the announcement location.

13. The system of claim 12, in which the correlating is based upon a server location identification provided in a user profile.

14. The system of claim 9, wherein the remote announcement location comprises a web server.

15. The system of claim 14, in which the web server is identified by a uniform resources locator (URL).

16. The system of claim 9, in which the announcement location comprises a web server, and both the web server and the web client are located behind a firewall.

17. A voice extensible markup language (VXML) platform for facilitating execution of a network service provided in a telecommunications network, the platform comprising:
    a receiver for receiving a message from a call processor, the message comprising an announcement identification;
    an analyzer for determining a remote announcement location where an announcement corresponding to the announcement identification is stored, based on at least the announcement identification; and
    an interface for playing the announcement retrieved from the remote announcement location,
    wherein the announcement stored at the remote announcement location can be created or changed by a user utilizing a web client without affecting the announcement identification.

18. The platform of claim 17, in which the receiver further comprises an intelligent peripheral (IP) component, and the analyzer and the interface further comprise a VIMS component.

19. The platform of claim 18, in which the IP component recognizes that the VIMS component will process the announcement identification based upon how the announcement identification has been encoded, and then forwards the announcement identification to the VIMS component.

20. The platform of claim 19, in which the VIMS component correlates the announcement identification to the announcement location based upon a server location identification provided in a user profile.

21. The platform of claim 17, in which the VXML platform communicates with the call processor using intelligent network application part (INAP) signaling.

22. The platform of claim 17, in which the announcement location comprises a web server, and the VXML platform communicates with the web server in order to play the announcement.

23. The platform of claim 17, in which the announcement location comprises a web server, and both the web server and the web client are located behind a firewall.

* * * * *